United States Patent
Stelle, IV et al.

(10) Patent No.: US 9,160,407 B2
(45) Date of Patent: Oct. 13, 2015

(54) METHOD FOR DETECTING LEAKAGE IN DIGITALLY MODULATED SYSTEMS

(75) Inventors: Raleigh Benton Stelle, IV, Indianapolis, IN (US); Dennis Lee Orndorff, Greenfield, IN (US)

(73) Assignee: Trilithic, Inc., Indianapolis, IN (US)

( * ) Notice: Subject to any disclaimer, the term of this patent is extended or adjusted under 35 U.S.C. 154(b) by 0 days.

(21) Appl. No.: 14/128,908

(22) PCT Filed: Jun. 26, 2012

(86) PCT No.: PCT/US2012/044123
§ 371 (c)(1), (2), (4) Date: Dec. 23, 2013

(87) PCT Pub. No.: WO2013/003301
PCT Pub. Date: Jan. 3, 2013

(65) Prior Publication Data
US 2014/0146864 A1  May 29, 2014

Related U.S. Application Data

(60) Provisional application No. 61/501,423, filed on Jun. 27, 2011, provisional application No. 61/564,429, filed on Nov. 29, 2011, provisional application No. 61/592,195, filed on Jan. 30, 2012.

(51) Int. Cl.
*H04L 27/06* (2006.01)
*H04B 3/46* (2015.01)
*H04N 17/00* (2006.01)

(52) U.S. Cl.
CPC ............. *H04B 3/46* (2013.01); *H04N 17/004* (2013.01)

(58) Field of Classification Search
CPC ......... H03M 5/02; H04L 7/042; H04L 43/00; H04L 1/24; H04L 12/26; H04B 17/00; H04B 3/46; H04B 1/709
USPC .................................. 375/340, 343, 373, 224
See application file for complete search history.

(56) References Cited

U.S. PATENT DOCUMENTS 3,978,282 A  8/1976  Fulton
4,032,716 A  6/1977  Allen
(Continued)

FOREIGN PATENT DOCUMENTS

WO    WO2010/144326    12/2010

OTHER PUBLICATIONS

PCT Search Report and Written Opinion for PCT/US2012/044123, completed Sep. 12, 2012.

*Primary Examiner* — Emmanuel Bayard
(74) *Attorney, Agent, or Firm* — Barnes & Thornburg LLP

(57) ABSTRACT

In a method for detecting leakage in a digital cable system, at least one first signal is inserted on the cable system. The at least one first signal has an amplitude multiple tens of dB below the digital channel power of the digital channels carried on the cable system. A second signal containing the first signal is received. The second signal is converted to an intermediate frequency (IF) signal. The IF signal is digitized and samples of the digitized IF signal are obtained. Digitized samples of a third signal at the nominal frequency of the first signal at maximum amplitude converted to the IF are provided. The digitized IF signal and the digitized samples of a third signal at the nominal frequency of the first signal at maximum amplitude converted to the IF are correlated. The presence of the inserted first signal is detected based upon the result of the correlation. In another method, a pair of first signals are inserted on the cable system. The pair of first signals are spaced apart a fixed frequency and with amplitudes multiple tens of dB below the digital channel power of the digital channels carried on the cable system. A second signal containing the first signal is received and converted to an intermediate frequency (IF) signal. The IF signal is digitized, samples of the digitized IF signal are obtained, and a large scale Fast Fourier Transform (FFT) is applied to the samples to generate an FFT output. The FFT output is examined for generally equally sized signals separated from each other by the fixed frequency in the FFT output. If generally equally sized signals separated from each other by the fixed frequency are detected in the FFT output, a decision is made that the second signal represents detected leakage from the digital cable system.

18 Claims, 18 Drawing Sheets

(56) References Cited

U.S. PATENT DOCUMENTS

| | | | | |
|---|---|---|---|---|
| 4,072,899 | A | 2/1978 | Shimp | |
| 4,868,494 | A * | 9/1989 | Ryder et al. | 324/76.33 |
| 5,608,428 | A | 3/1997 | Bush | |
| 5,777,662 | A | 7/1998 | Zimmerman | |
| 5,784,403 | A * | 7/1998 | Scott | 375/151 |
| 5,987,059 | A * | 11/1999 | Harrison et al. | 375/150 |
| 6,018,358 | A | 1/2000 | Bush | |
| 6,313,874 | B1 | 11/2001 | Bowyer et al. | |
| 6,600,515 | B2 | 7/2003 | Bowyer et al. | |
| 6,801,162 | B1 | 10/2004 | Eckenroth et al. | |
| 6,804,826 | B1 | 10/2004 | Bush et al. | |
| 6,833,859 | B1 | 12/2004 | Schneider et al. | |
| 7,395,548 | B2 | 7/2008 | Runzo | |
| 7,397,865 | B2 * | 7/2008 | Moore et al. | 375/308 |
| 7,415,367 | B2 | 8/2008 | Williams | |
| 7,529,320 | B2 * | 5/2009 | Byrne et al. | 375/326 |
| 7,548,201 | B2 | 6/2009 | Eckenroth et al. | |
| 7,620,611 | B1 | 11/2009 | Sinde | |
| 7,630,430 | B2 * | 12/2009 | Bochkovskiy et al. | 375/150 |
| 7,788,050 | B2 | 8/2010 | Williams | |
| 7,945,939 | B2 | 5/2011 | Eckenroth et al. | |
| 7,991,043 | B2 * | 8/2011 | Gorday | 375/150 |
| 8,619,837 | B2 * | 12/2013 | Proctor et al. | 375/211 |
| 8,749,248 | B2 | 6/2014 | Murphy et al. | |
| 8,849,226 | B2 * | 9/2014 | Bruchner | 455/190.1 |
| 2002/0095686 | A1 * | 7/2002 | Shi et al. | 725/107 |
| 2004/0174309 | A1 | 9/2004 | Terreault et al. | |
| 2006/0248565 | A1 | 11/2006 | Shimp et al. | |
| 2006/0274858 | A1 | 12/2006 | May | |
| 2007/0043303 | A1 * | 2/2007 | Osypka et al. | 600/547 |
| 2008/0033698 | A1 | 2/2008 | Stelle | |
| 2008/0133308 | A1 | 6/2008 | Harris | |
| 2010/0329405 | A1 * | 12/2010 | Chen et al. | 375/371 |
| 2012/0257661 | A1 | 10/2012 | Murphy et al. | |
| 2013/0301391 | A1 * | 11/2013 | Altman et al. | 367/100 |
| 2014/0177754 | A1 * | 6/2014 | Murphy et al. | 375/296 |
| 2015/0077129 | A1 * | 3/2015 | Zinevich | 324/512 |

* cited by examiner 10.7 MHz to µC 338

METHOD FOR DETECTING LEAKAGE IN DIGITALLY MODULATED SYSTEMS

CROSS-REFERENCE TO RELATED APPLICATIONS

This application is the U. S. national phase of PCT/US2012/044123 filed Jun. 26, 2012. PCT/US2012/044123 claims the benefit of the Jun. 27, 2011 filing date of U.S. Ser. No. 61/501,423, the Nov. 29, 2011 filing date of U.S. Ser. No. 61/564,429 and the Jan. 30, 2012 filing date of U.S. Ser. No. 61/592,195. The disclosures of U.S. Ser. No. 61/501,423, U.S. Ser. No. 61/564,429, U.S. Ser. No. 61/592,195, and PCT/US2012/044123 are incorporated herein by reference.

BACKGROUND

This invention relates to methods for detecting egress from cable systems that have deployed digital signals.

Various types of leakage detection equipment for cable systems are known. There are, for example, the devices illustrated and described in: published U.S. patent applications 2008/0133308; 2008/0033698; and, 2006/0248565; and, U.S. Pat. Nos. 7,945,939; 7,788,050; 7,548,201; 7,415,367; 7,395,548; 6,833,859; 6,804,826; 6,801,162; 6,600,515; 6,313,874; 6,018,358; 5,777,662; 5,608,428; and, 4,072,899. The disclosures of the cited references are incorporated herein by reference. No representation is intended by this listing that an exhaustive search of all pertinent prior art has been made or that no better art than that listed exists, and no such representation should be inferred. This listing does not constitute a representation that the material listed is pertinent, and no such representation should be inferred.

SUMMARY

A method for detecting leakage in a digital cable system comprises inserting at least one first signal with an amplitude multiple tens of dB below the digital channel power of the digital channels carried on the cable system. The method further comprises receiving a second signal containing the at least one first signal, converting the second signal to an intermediate frequency (IF) signal, digitizing the IF signal, obtaining samples of the digitized IF signal, and providing a set of digitized samples of a third signal at the nominal frequency or frequencies of the at least one first signal at maximum amplitude converted to the IF. The method further comprises correlating the digitized IF signal and the digitized samples of a third signal at the nominal frequency or frequencies of the at least one first signal at maximum amplitude converted to the IF, and detecting the presence of the inserted at least one first signal based upon the result of the correlation.

Illustratively, the method further includes sweeping the at least one first signal to promote correlation with the digitized samples of a third signal.

Illustratively, sweeping the at least one first signal comprises sweeping the at least one first signal at the transmitting device.

Illustratively, sweeping the at least one first signal comprises sweeping the at least one first signal at the receiving device.

Illustratively, converting the second signal to an IF signal comprises converting the second signal to an IF signal having a bandwidth of about 100 KHz.

Illustratively, converting the second signal to an IF signal comprises converting the second signal to an IF signal having a frequency greater than about 0.2% of the digitizing frequency of the IF.

Illustratively, inserting the at least one first signal comprises inserting the at least one first signal below the digital channel signal channel.

Illustratively, inserting the at least one first signal comprises inserting the at least one first signal above the digital channel signal channel.

Illustratively, detecting the presence of the inserted at least one first signal based upon the result of the correlation comprises detecting the presence of the inserted at least one first signal within an ~250 ms window.

Illustratively, obtaining samples of the digitized IF signal comprises obtaining samples of the digitized IF signal using an A/D converter.

Illustratively, obtaining samples of the digitized IF signal comprises obtaining samples of the digitized IF signal using an A/D converter having a first sampling rate and then upsampling the data to a second, higher sample rate.

Illustratively, converting the second signal to an IF signal comprises converting the second signal to a 455 KHz IF.

According to another aspect, a method for detecting leakage in a digital cable system comprises inserting a pair of first signals spaced apart a fixed frequency and with amplitudes multiple tens of dB below the digital channel power of the digital channels carried on the cable system, receiving a second signal containing the first signals, converting the second signal to an IF signal and digitizing the IF signal; obtaining samples of the digitized IF signal. The method further comprises applying a large scale Fast Fourier Transform (hereinafter sometimes FFT) to the second signal to generate an FFT output, examining the FFT output for generally equally sized signals separated from each other by the fixed frequency in the FFT output, and, if generally equally sized signals separated from each other by the fixed frequency are detected in the FFT output, deciding that the second signal represents detected leakage from the digital cable system.

Illustratively, the FFT has a sample size on the order of at least about 32 kilosamples (32 Ksamples).

Illustratively, converting the second signal to an IF signal comprises converting the second signal to an IF signal having a bandwidth of about 15 KHz.

Illustratively, inserting a pair of first signals spaced apart a fixed frequency comprises inserting the pair of first signals between adjacent digital channel signal channels.

Illustratively, obtaining samples of the digitized IF signal comprises obtaining samples of the digitized IF signal using an A/D converter.

Illustratively, converting the second signal to an IF signal comprises converting the second signal to a 10.7 MHz IF.

According to another aspect, apparatus is provided for tagging a digital CATV signal. The apparatus comprises a controller, a first source of a first frequency and a second source of a second frequency. The first frequency source has a first input port, a first output port for supplying signals to the controller, and a second output port coupled to an input port of a first fixed attenuator. The second frequency source has a first input port, a first output port for supplying signals to the controller, and a second output port coupled to a first input port of a first variable attenuator. The first variable attenuator further includes a second input port for receiving signals from the controller. An output port of the first fixed attenuator is coupled to a first input port of a first signal combiner. An output port of the first variable attenuator is coupled to a second input port of the first signal combiner to combine the signals from first fixed attenuator and the first variable attenuator at an output port of the first signal combiner. An output port of the first signal combiner is coupled to a CATV plant to place the digital channel tag on the CATV plant. The switch further includes a second input port for receiving signals from the controller.

Illustratively, the output port of the first signal combiner is coupled to a first input port of a switch. The switch further includes a second input port for receiving signals from the controller. The digital channel tag is provided at an output port of the switch Illustratively, the output port of the first signal combiner is coupled to an input port of a second variable attenuator. The second variable attenuator further includes a second input port for receiving signals from the controller. An output port of the second variable attenuator is coupled to the first input port of the switch.

Illustratively, the first frequency source first input port is coupled to the controller to receive first frequency tuning instructions from the controller.

Illustratively, the second frequency source first input port is coupled to the controller to receive second frequency tuning instructions from the controller.

Illustratively, the output port of the first signal combiner is coupled to a first input port of a diplex filter. The apparatus further comprises a third frequency source. The third frequency source has a first input port, a first output port for supplying signals to the controller, and a second output port coupled to an input port of a second fixed attenuator. The second fixed attenuator includes an output port coupled to a first input port of a second signal combiner. A fourth frequency source has a first input port, a first output port for supplying signals to the controller, and a second output port coupled to a first input port of a second variable attenuator. The second variable attenuator further includes a second input port for receiving signals from the controller. An output port of the second signal combiner is coupled to the first input port of the switch.

Illustratively, the third frequency source first input port is coupled to the controller to receive third frequency tuning instructions from the controller.

Illustratively, the fourth frequency source first input port is coupled to the controller to receive fourth frequency tuning instructions from the controller.

According to another aspect, apparatus is provided for determining whether a received signal is a digital CATV tag inserted between adjacent digital CATV channels. The apparatus includes an apparatus input port for receiving the signal, and a first filter having an input port coupled to the apparatus input port. A first mixer has a first input port, a second input port and an output port. A first frequency source has an output port coupled to the first input port of the first mixer. A second filter has an input port coupled to the output port of the first mixer and an output port coupled to a first input port of a second mixer. The second mixer further includes a second input port and an output port. A second frequency source is coupled to the second input port of the second mixer. A third filter has an input port and an output port. The third filter input port is coupled to the output port of the second mixer and the third filter output port is coupled to the apparatus output port. An indication whether the received signal is a digital CATV tag inserted between adjacent digital CATV channels appears at the apparatus output port.

Illustratively, the first filter comprises first and fourth filters. The first filter has an input port coupled to a first output port of a first switch. The fourth filter has an input port coupled to a second output port of the first switch.

Illustratively, the first filter comprises first and fifth filters. The first filter has an output port coupled to a first input port of a second switch. The fifth filter has an output port coupled to a second input port of the second switch.

Illustratively, the second filter having an input port coupled to the output port of the first mixer and an output port coupled to a first input port of a second mixer comprises a second filter having an input port coupled to the output port of the first mixer and a fourth filter having an input port coupled to the output port of the second filter and an output port coupled to the first input port of the second mixer.

Illustratively, the third filter comprises a third filter having an input port and an output port and a sixth filter having an input port and an output port. The third filter input port is coupled to the output port of the second mixer. The sixth filter input port is coupled to the output port of the third filter. The sixth filter output port is coupled to the apparatus output port.

Illustratively, the sixth filter having an input port and an output port coupled to the apparatus output port comprises a sixth filter and a seventh filter. The sixth filter has an input port coupled to the third filter output port and an output port coupled to an input port of the seventh filter. The seventh filter output port is coupled to the apparatus output port.

BRIEF DESCRIPTION OF THE DRAWINGS

The invention may best be understood by referring to the following detailed description and accompanying drawings which illustrate the invention. In the drawings.

DETAILED DESCRIPTION

Figure 1:
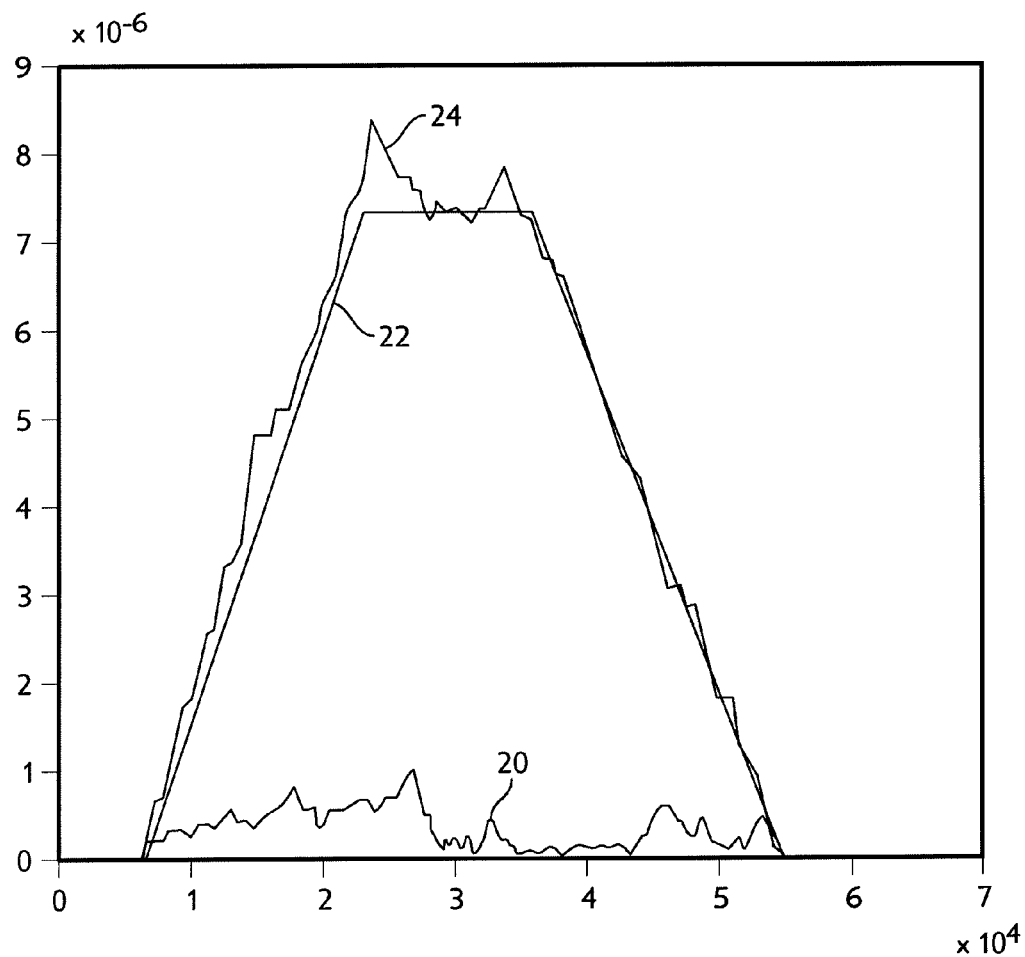
FIG. 1 illustrates three signals plotted on the same x axis.

Broadcasters face tremendous revenue pressure to convert to fully digital systems. This revenue pressure is driving the conversion. Once a system converts, legacy egress detection equipment will no longer accurately detect and identify leakage, and must be replaced by equipment and methods that can reliably detect egress in the digital environment. The described methods are very low cost and are minimally invasive to the broadcast system. The inserted signals are at levels below the detection thresholds of currently deployed broadcast equipment. The described methods permit the broadcaster to utilize the forward, or downstream, bandwidth of the cable system fully, without any dedicated bandwidth requirements.

The described systems contemplate the insertion of one or more continuous wave (hereinafter sometimes CW) signals with (an) amplitude(s) multiple tens of dB down, for example, −30 dB down, 40 dB down, and so on, from the digital channel power. The level(s) chosen will be one(s) that provide(s) the user with minimal or no signal impairment. The inserted carrier(s) can be located on either side of the digital signal channel. To detect the presence of the CW signals radiated from the cable system as leakage with the correlation-based detection methods described herein, a leakage receiver will have an IF bandwidth in the range of 100 KHz to receive the CW signal(s) and convert it (them) to (an) IF frequency (frequencies) permitting obtaining of digital samples of the received leakage signal. To detect the presence of the CW signals radiated from the cable system as leakage with the FFT detection method described herein, a leakage receiver will have a very narrow IF bandwidth while still accommodating a realistic amount of signal placement inaccuracy. A 15 KHz bandwidth is currently contemplated as necessary to accommodate analysis of the 700 MHz band to receive the CW signal(s) and convert it (them) to (an) IF frequency (frequencies) permitting obtaining of digital samples of the received signal using the FFT-based detection method described herein.

An A/D converter is used to obtain a sample window of the combined ambient noise and CW signal(s). A sample window of a signal at the same frequency as the CW signal at maximum amplitude is then used in a correlation algorithm and compared to the sample window of the digitized received combined ambient noise and CW signal. Given enough continuous samples of both windows, the presence of the inserted CW signal(s) can be detected, even in the presence of noise that is of significantly higher amplitude than the CW signal(s).

Certain relationships become apparent. For example, given that the number of samples for the windows can be doubled (allowing for more time), a +6 dB improvement in the perceived carrier-to-noise ratio (hereinafter sometimes C/N) of the CW signal can be achieved. This same effect can be used to advantage if the effective sampling rate can be doubled without increasing the amount of time sampled. So it will be appreciated that if the sampling rate is sufficiently high, allowing for a sufficient number of samples per unit time, the C/N can be improved so that, even if the inserted signal is well below the level of the noise, the inserted signal can still be detected.

It is believed that the wider the bandwidth of the combined ambient noise and CW signal(s) the better. This is so because the narrower the bandwidth of the combined samples the more closely the output becomes essentially single frequency. But essentially single frequency is exactly what the CW signal is. Since the inserted CW signal is a single frequency but is potentially lower than the noise in amplitude it becomes practically impossible to detect it reliably. With wider band noise, the coherency to a single frequency becomes less over the total sample window for the noise components but remains essentially unchanged for the inserted CW, making it detectable.

It is also believed that the IF of the receiving device must be greater than 0.2% of the sampling frequency in order to be detectable. If the IF of the receiving device is not greater than 0.2% of the sampling frequency, then the detection envelop of the desired signal (the inserted CW carrier) begins to exhibit very low frequency lobes that can no longer be filtered out and still permit the system to remain responsive. IF of the receiving device greater than 0.2% of the sampling frequency is easily achieved by selecting an IF which is an appreciable percentage of the sampling rate.

Another observation with this method is that for significant C/N improvements (large sample size), the detection bandwidth becomes quite narrow (on the order of ±1 Hz). This characteristic of the method requires considerable frequency accuracy in the transmitting and receiving devices. This narrow detection bandwidth is not practical for real systems given any number of accuracy detriments which occur normally. However, this accuracy requirements can be mitigated by slowly sweeping the inserted CW carrier(s) across the sample bandwidth (approximately ±1 KHz) in order that there will be alignment, with its resultant correlation, at some point within the approximately ±1 Hz detection bandwidth. A sweep rate of approximately 2 to 3 Hz provides enough of a sample window length to perform the detection. Either the transmitting or receiving device's frequency can be swept to produce this effect.

In order for the system to be responsive in a mobile application, the field detection portion of the system must detect the presence of the signal within an ~250 ms window. Also, in order to achieve adequate signal to noise margin for the measurement, 20-30 Ksamples must be collected. Given the issues cited in the previous paragraph, all of the required samples must fit within the small portion of the time window during which the particular 2 Hz detection bandwidth being observed is swept. So if it is assumed that the sweep rate is 2 Hz and the swept bandwidth will be 2 KHz total, this gives 250 µs (2 Hz/2 KHz=1/1000 of the ~250 ms window) of time where the frequency will be matched closely enough to be detectable. The peak value of detection will be obtained in the middle 1 Hz of the bandwidth, so enough samples need to be fitted into that window to obtain the detected leak level. This means that 20-30 Ksamples need to be fitted into the ~125 µs (250 µs/2) window. Thus, the effective sampling rate must be in the ~160 to ~240 Msps (20 Ksamples/125 µs≤effective sampling rate≤30 Ksamples/125 µs) range to achieve detection quickly enough. This sampling frequency can be achieved by either sampling at that rate with a high speed A/D converter or using a slower A/D converter and upsampling the data to create the faster sample rate.

Since the sampling frequency does not bear any significant relationship to the frequency being detected other than the >0.2% of sampling frequency requirement mentioned earlier, almost any IF, 455 KHz, 10.7 MHz, etc., could be used, as long as it meets the >0.2% of sampling frequency requirement. In the simulation below, 455 KHz was used as the IF, since 455 KHz IF is very common. The filter bandwidth used was sufficiently wide to admit input noise which, as mentioned above, is important to the ability to detect the inserted CW.

FIG. 1 plots three signals 20, 22, 24 on the same x axis. The x axis can be referred to as number of samples, which for a given sample rate equates to time. The signal 20 is the "noise only" signal with no reference trace inserted and is seen significantly below the other two for most of the graph's x axis. The signal 22 that appears as a trapezoid is the result of the proposed detection algorithm given only the inserted CW reference signal with no noise at all, making signal 22 essentially the ideal detection envelope. The signal 24 is the result given the reference signal 22 and the noise 20 combined as would occur normally. As can clearly be seen from FIG. 1, an envelope level 22 well above the "noise" floor 20 with good C/N margin is quickly reached. The simulation results were achieved using the following Matlab® code segments:

```
Fs = 2e6; %sample frequency of the ADC
simlength =30000; %number of samples in use
Fc = 455e3; %actual frequency of inserted signal
Fref = 455e3; %frequency we are looking for
kTB = −174 + 10*log10(48.828125); % assume receiver RBW of
48.828125Hz for a 1024 FFT and 50ohm system
fbp = filterbp1;
bp = fbp.Numerator;
flp = filterlp1;
lp1 = flp.Numerator;
flp = filterlp2;
lp2 = flp.Numerator;
```

```
fhp = filterhp1;
hp1 = fhp.Numerator;
s = cos(2*pi*[0:simlength]*Fc/Fs);
tx = s*10^((-30 -118 - 10*log10(mean(s.^2)))/20);
sref = cos(2*pi*[0:simlength]*Fref/Fs);
noise = 2*rand(1,length(tx)+ length(bp));
meannoise = mean(noise);
noise = noise-meannoise;
ns = noise; % apply wideband noise
ns = ns(length(bp):length(bp)+length(tx)-1);
ns1 = ns*10^(( kTB - 10*log10(mean(ns.^2)) + 21.4)/20);
clear ns;
clear noise;
clear fbp;
clear bp;
clear flp;
clear fhp;
modsq = 0.5 + 0.5*(square([0:length(s)-1]*2000/Fs,50));
modpulse = [zeros(1,5000) ones(1,simlength-10000) zeros(1,5001)];
modsig = modpulse.*sref; % this is the reference waveform for
convolution
clear modpulse;
clear sref;
clear modsq;
s=tx;
clear tx;
clear mod1;
clear lp2;
clear hp1;
pksig=filter(lp1,1,abs(xcorr(s,modsig)));
pknoise=filter(lp1,1,abs(xcorr(ns1,modsig)));
pksignoise=filter(lp1,1,abs(xcorr(s+ns1,modsig)));
clear lp1;
cndB = 20*log10(abs(pksignoise-pknoise));
AND:
function Hd = filterbp1
%FILTERBP1 Returns a discrete-time filter object.
%
% MATLAB Code
% Generated by MATLAB(R) 7.11.1 and the Signal Processing
Toolbox 6.14.
%
% Generated on: 02-Jun-2011 15:45:50
%
% Equiripple Bandpass filter designed using the FIRPM function.
% All frequency values are in Hz.
Fs = 2000000; % Sampling Frequency
Fstop1 = 140000;        % First Stopband Frequency
Fpass1 = 151000;        % First Passband Frequency
Fpass2 = 759000;        % Second Passband Frequency
Fstop2 = 770000;        % Second Stopband Frequency
Dstop1 = 0.001;         % First Stopband Attenuation
Dpass = 0.0057563991496; % Passband Ripple
Dstop2 = 0.001;         % Second Stopband Attenuation
dens = 20;              % Density Factor
% Calculate the order from the parameters using FIRPMORD.
[N, Fo, Ao, W] = firpmord([Fstop1 Fpass1 Fpass2 Fstop2]/(Fs/2), [0 1 ...
      0], [Dstop1 Dpass Dstop2]);
% Calculate the coefficients using the FIRPM function.
b = firpm(N, Fo, Ao, W, {dens});
Hd = dfilt.dffir(b);
% [EOF]
AND:
function Hd = filterhp1
%FILTERHP1 Returns a discrete-time filter object.
%
% MATLAB Code
% Generated by MATLAB(R) 7.11.1 and the Signal Processing
Toolbox 6.14.
%
% Generated on: 26-May-2011 09:41:35
%
% Equiripple Highpass filter designed using the FIRPM function.
% All frequency values are in Hz.
Fs = 50000; % Sampling Frequency
Fstop = 200;            % Stopband Frequency
Fpass = 400;            % Passband Frequency
Dstop = 0.0001;         % Stopband Attenuation
Dpass = 0.057501127785; % Passband Ripple
dens = 20;              % Density Factor
% Calculate the order from the parameters using FIRPMORD.
[N, Fo, Ao, W] = firpmord([Fstop, Fpass]/(Fs/2), [0 1], [Dstop, Dpass]);
% Calculate the coefficients using the FIRPM function.
b = firpm(N, Fo, Ao, W, {dens});
Hd = dfilt.dffir(b);
% [EOF]
AND:
function Hd = filterlp1
%FILTERLP1 Returns a discrete-time filter object.
%
% MATLAB Code
% Generated by MATLAB(R) 7.11.1 and the Signal Processing
Toolbox 6.14.
%
% Generated on: 25-May-2011 08:41:18
%
% Equiripple Lowpass filter designed using the FIRPM function.
% All frequency values are in Hz.
Fs = 50000; % Sampling Frequency
Fpass = 5;              % Passband Frequency
Fstop = 100;            % Stopband Frequency
Dpass = 0.057501127785; % Passband Ripple
Dstop = 0.01;           % Stopband Attenuation
dens = 20;              % Density Factor
% Calculate the order from the parameters using FIRPMORD.
[N, Fo, Ao, W] = firpmord([Fpass, Fstop]/(Fs/2), [1 0], [Dpass, Dstop]);
% Calculate the coefficients using the FIRPM function.
b = firpm(N, Fo, Ao, W, {dens});
Hd = dfilt.dffir(b);
% [EOF]
AND:
function Hd = filterlp2
%FILTERLP2 Returns a discrete-time filter object.
%
% MATLAB Code
% Generated by MATLAB(R) 7.11.1 and the Signal Processing
Toolbox 6.14.
%
% Generated on: 26-May-2011 09:40:31
%
% Equiripple Lowpass filter designed using the FIRPM function.
% All frequency values are in Hz.
Fs = 50000; % Sampling Frequency
Fpass = 400;            % Passband Frequency
Fstop = 600;            % Stopband Frequency
Dpass = 0.057501127785; % Passband Ripple
Dstop = 0.0001;         % Stopband Attenuation
dens = 20;              % Density Factor
% Calculate the order from the parameters using FIRPMORD.
[N, Fo, Ao, W] = firpmord([Fpass, Fstop]/(Fs/2), [1 0], [Dpass, Dstop]);
% Calculate the coefficients using the FIRPM function.
b = firpm(N, Fo, Ao, W, {dens});
Hd = dfilt.dffir(b);
% [EOF]
```

A few factors can influence the outcome of the simulation. For example, the outcome is heavily dependent on the level of the inserted signal versus the level of the noise. If the noise level of the system is higher than that assumed in the above simulation, due, for example, to the noise figure of the receiver involved, or due to the adjacent digital channels having enough carrier drift to place them slightly closer to the inserted signal(s), then the signal-to-noise (hereinafter sometimes S/N) margin is decreased and the measurement may be compromised. However, as mentioned before, all that need be done to compensate for this is to use a combination of increasing the number of samples in the window and increasing the sample rate until the issue is resolved. The system is robust against these possible issues. This robustness is accomplished by using the best possible noise figure for the receiver, as well as by processing as many samples as possible to maximize the S/N ratio.

Since a single inserted CW carrier can be interfered with by a narrow band ingress signal in the same frequency, it is further contemplated to insert a second CW carrier at the same amplitude as the first but offset in frequency in order to gain more certainty that the signal(s) being detected is (are) the one(s) being inserted, and not an off-air ingress event. By comparing the detection results of two or more well-matched inserted signals, the user may be more confident not only of the detected level, but also that the signals being detected are the inserted CW carriers. This method also permits the user to choose the spacing between the inserted CW carriers which can be varied, for example, from cable system operator to cable system operator, to provide a unique "tag" to distinguish one cable system from another using a different spacing, for example, in overbuilt situations. Since the signals will be swept with known spacing across the sample bandwidth enough to ensure detection, care must be taken to make sure the separation of the two (or more) CW frequencies is great enough that the wrong signal is not detected in either (any) one of the two (or more) detectors, even after all system frequency offsets and drifts are factored in.

Although the inserted signal(s) is (are) described as CW signals, sweeping it (them) through 2 to 3 Hz as described is essentially frequency modulation. Other modulations of the inserted signals may be employed without adversely affecting detectability. For example, a 1 or 2 Hz amplitude modulation can be placed on the inserted signal without affecting detectability. In other cases, AM, FM or phase modulation is performed using a predetermined modulation sequence to cause spreading of the inserted signal to reduce inserted signal accuracy issues in the same way as is being addressed in the described embodiment using the 2 to 3 Hz sweep.

Another method for detecting the low level tag utilizes the same A/D converter. However, instead of changing the sample rate of the incoming data, the incoming data rate remains unchanged. In this embodiment, noise suppression is achieved by applying a large scale FFT, for example, one on the order of 32 Ksamples in size or larger to the incoming data. The exact size of the FFT is not important. There is no upper limit, other than the capacity of the hardware with which the method is implemented. An FFT of 32 Ksamples in size produces a suitable C/N margin for the inserted CW signals.

Simulation using Matlab® software has produced good results with sizes at or above 32 Ksamples being used. Increasing the number of samples beyond 32 Ksamples improves the C/N margin, up to the storage and precision limits of the hardware that is used to implement the design. The FFT output is basically a full frequency spectrum representation of the samples obtained from the A/D converter. The method according to this embodiment then looks at the FFT output for more or less equal amplitude CW signals at the programmed frequency separation from each other in the spectrum. The spacing of the signals from each other can be programmed over some practical range and used as a unique identification for systems which are overbuilt, in a manner similar to the AM tagging scheme described in, for example, U.S. Pat. No. 5,608,428. The frequency location issues described above in connection with the first method which required sweeping the signal through the detection bandwidth, do not exist with this method. This makes the headend equipment/transmitter simpler than would be required by the first method. Those issues do not exist with this method by virtue of the frequency spectrum analysis since the spectrum will identify the signals regardless of exactly where they occur. All that is necessary is to scan the FFT output for, and locate, more or less equal amplitude pulses at the programmed frequency separation from each other regardless of where they appear in the spectrum to insure that they are the inserted carriers by virtue of the spacing between them and their substantially equal amplitudes. If these criteria are not met, the signal will not be interpreted as detected leakage by the system. If these criteria are met, the signal will be interpreted as detected leakage by the system. The primary advantage of this method is that it permits the use of lower sample rate data, which reduces the size, cost, and power consumption of the circuit required to analyze the data. Also, by removing the previously described frequency error problem which attended the first method, the size, cost and power consumption were reduced, not only for the field piece but also for the headend equipment as well.

Figure 2A:
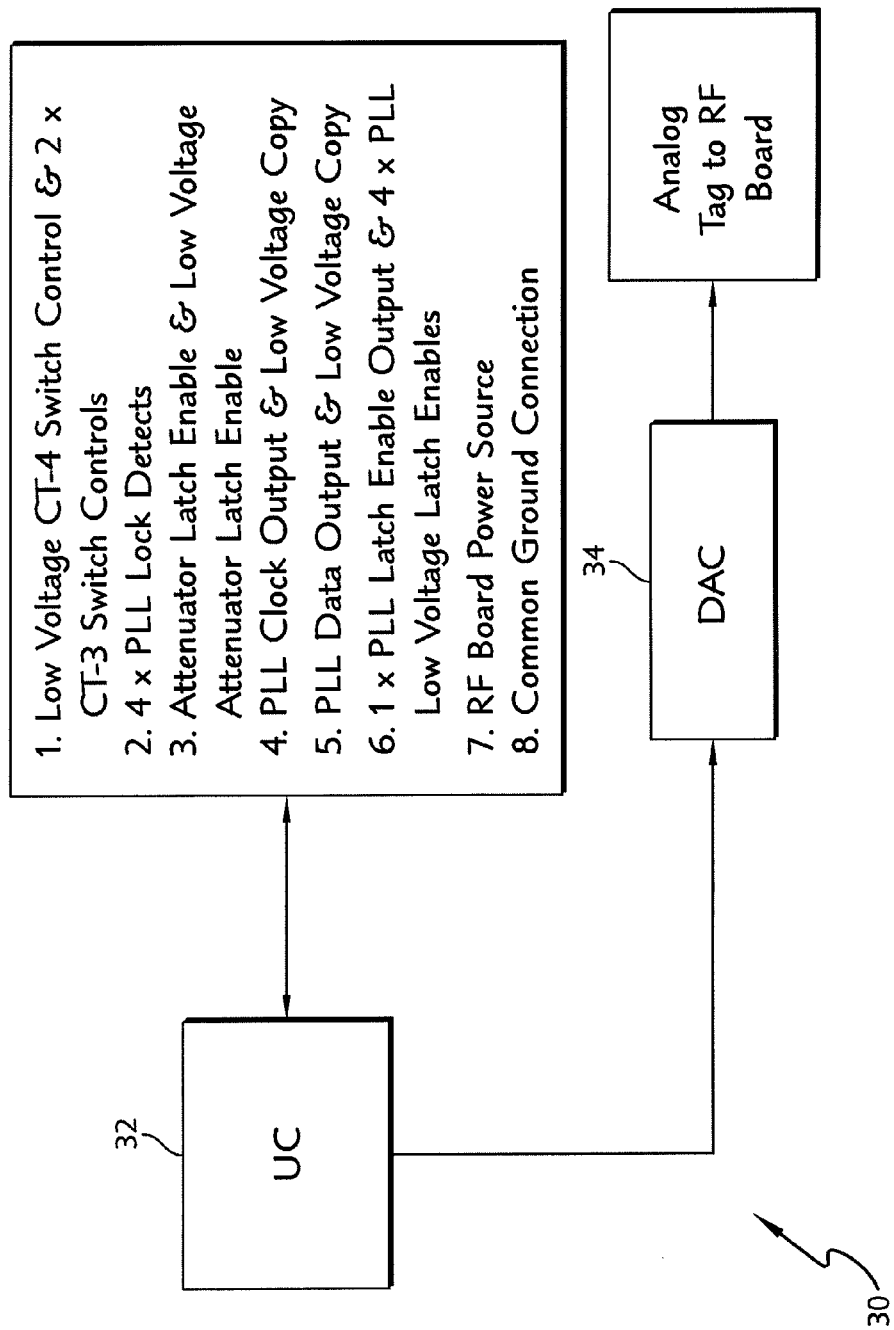
FIGS. 2*a-g* illustrate a block diagram of a tagger circuit board.
Figure 2B:
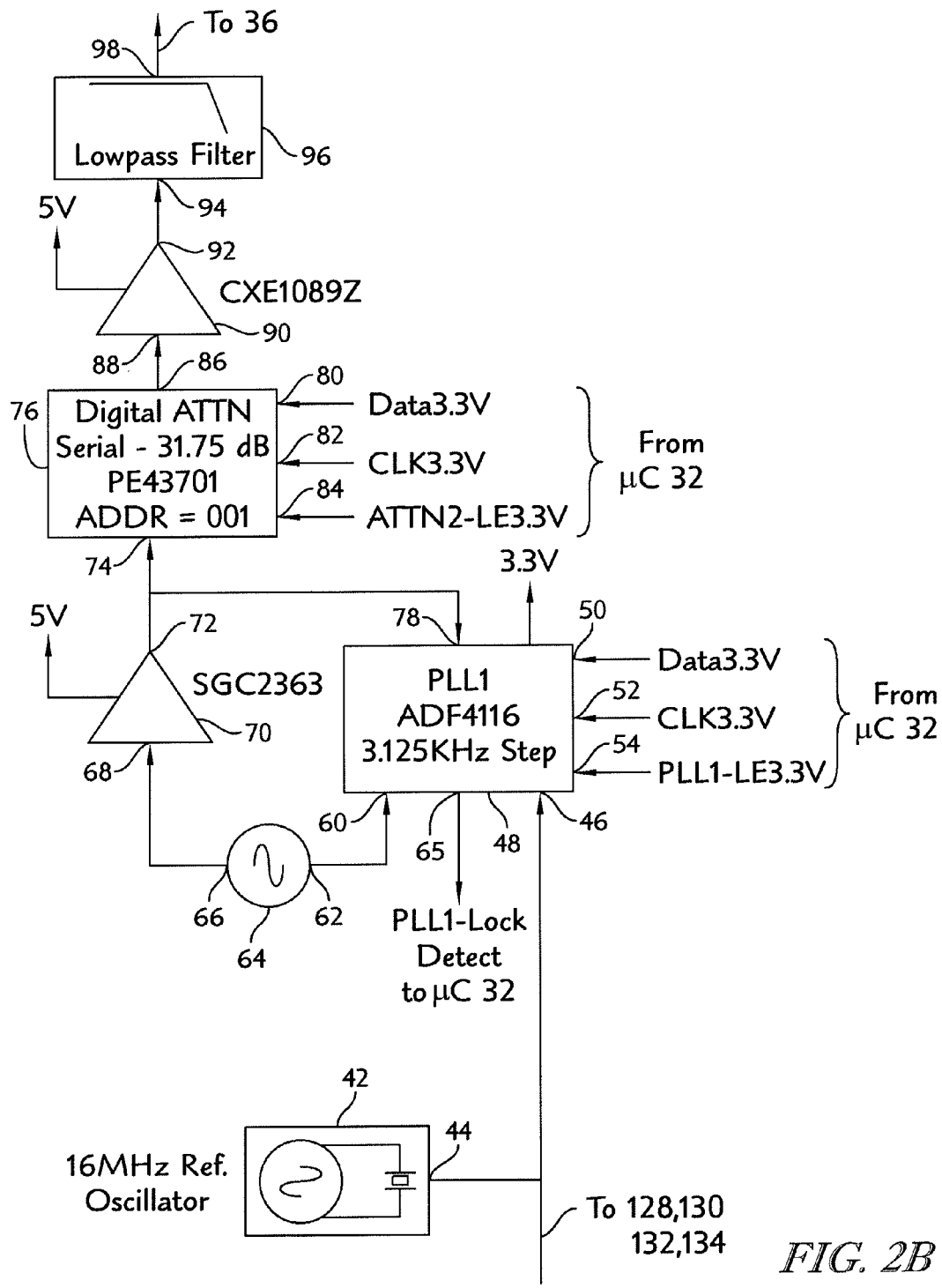
Figure 2C:
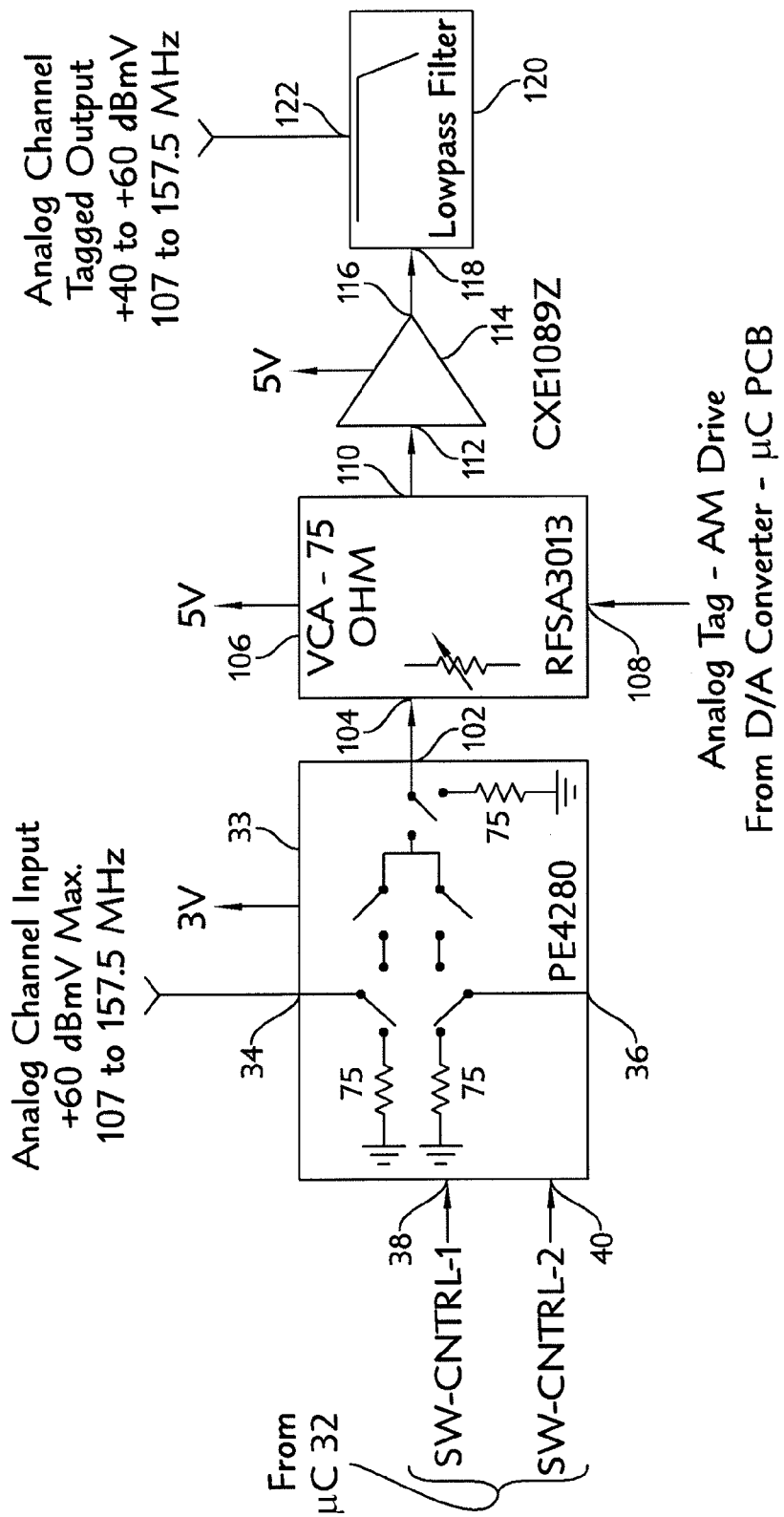

A block diagram of the tagger 31 is illustrated in FIGS. 2*a*-*g*. Referring first to FIG. 2*a*, the tagger board 30 includes a microcontroller (hereinafter sometimes μC) 32 providing: switch controls for switching between a digital channel tagging environment and an analog channel tagging environment; four phase locked loop (hereinafter sometimes PLL) Lock Detects; an attenuator latch enable and low voltage attenuator latch enable; a PLL Clock output and low voltage copy; a PLL Data output and low voltage copy; a PLL Latch Enable output and four PLL low voltage Latch Enables; an RF board power source; and a Common Ground Connection. The tagger board 30 further includes a digital-to-analog converter (hereinafter sometimes DAC) 34 whose output is an analog tag for coupling to the tagger 31's RF board, FIGS. 2*b*-*g*.

The tagger 31 includes circuits for tagging an analog channel with an analog tag in the manner taught by, inter alia, U.S. Pat. No. 5,608,428. These circuits include a controllable switch 33 (FIG. 2*c*) having an analog channel input port 34 with +60 dBmV maximum input amplitude and a frequency f, 107 MHz≤f≤157.5 MHz. Switch 33 also includes a CW signal input port 36, a switch control 1 input port 38 and a switch control 2 input port 40 from μC 32. Switch 33 illustratively is a Peregrine Semiconductor type PE4280 75Ω terminating SPDT switch. A 16 MHz reference oscillator 42 (FIG. 2*b*) has an output port 44 coupled to an input port 46 of a PLL 48. Other input ports 50, 52 and 54, respectively, of PLL 48 are coupled to DATA 3.3V, CLocK 3.3V and PLL 48 LoadEnable 3.3V. An output port 60 of PLL 48 is coupled to an input port 62 of a Voltage Controlled Oscillator (hereinafter sometimes VCO) 64. PLL 48 illustratively is an Analog Devices ADF4116 PLL having a 3.125 KHz step. PLL 48 also outputs at a port 65 a PLL1 LOCK DETECT signal to μC 32. An output port 66 of VCO 64 is coupled to an input port 68 of an amplifier 70. An output port 72 of amplifier 70 is coupled to an input port 74 of a digital attenuator 76 and to a phase detect input port 78 of PLL 48. Amplifier 70 illustratively is a Sirenza Microdevices type SGC-2363 amplifier. Other input ports 80, 82, 84, respectively, of digital attenuator 76 are coupled to DATA 3.3V, CLK 3.3V and ATTeNuator 2-LE 3.3V. An output port 86 of digital attenuator 76 is coupled to an input port 88 of an amplifier 90. Digital attenuator 76 illustratively is a Peregrine Semiconductor type PE43701 digital attenuator. Amplifier 90 illustratively is an RF Micro Devices type CXE1089Z amplifier. An output port 92 of amplifier 90 is coupled to an input port 94 of a low pass filter 96 ($f_C$=160 MHz). An output port 98 of filter 96 is coupled to port 36 of switch 33. An output port 102 of switch 33 is coupled to an input port 104 of a voltage controlled attenuator (hereinafter sometimes VCA) 106. Another input port 108 of VCA 106 is coupled to an output port of the μC board 30's D/A converter 34. An output port 110 of VCA 106 is coupled to an input port 112 of an amplifier 114. An output port 116 of amplifier 114 is coupled to an input port 118 of a low pass filter 120 ($f_C$=160 MHz). Amplifier 90 illustratively is an RF Micro Devices type CXE1089Z amplifier. VCA 106 illustratively is an RF Micro Devices type RFSA3013 voltage controlled attenuator. An output port 122 of filter 120 provides an analog channel tagged output of +40 dBmV to +60 dBmV at frequency f, 107 MHz≤f≤157.5 MHz. The tagged signal may either be a CW signal (when the switches of switch 33 are in one position) or a tagged analog channel signal (when the switches of switch 33 are in another position).

Figure 2D:
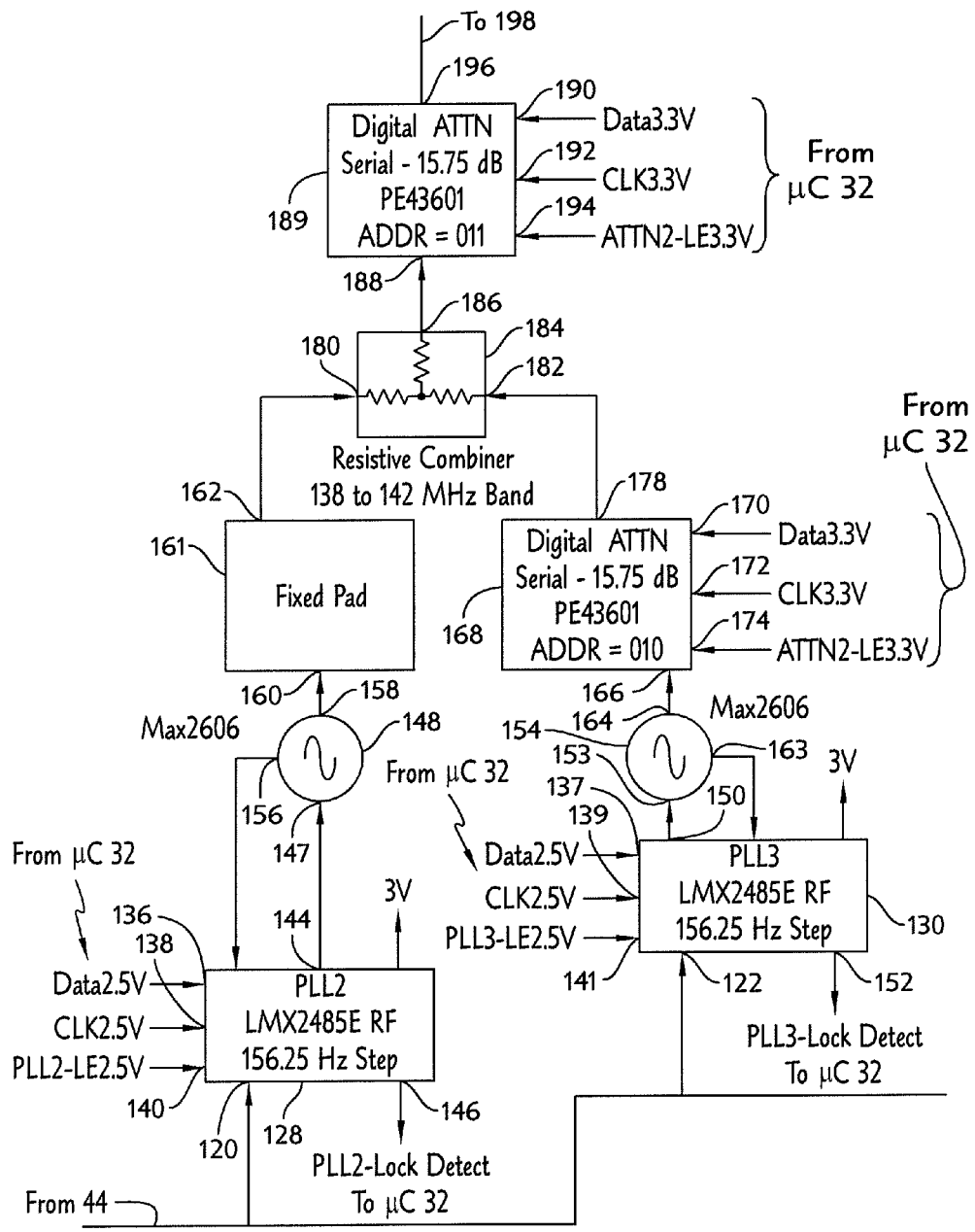
Figure 2E:
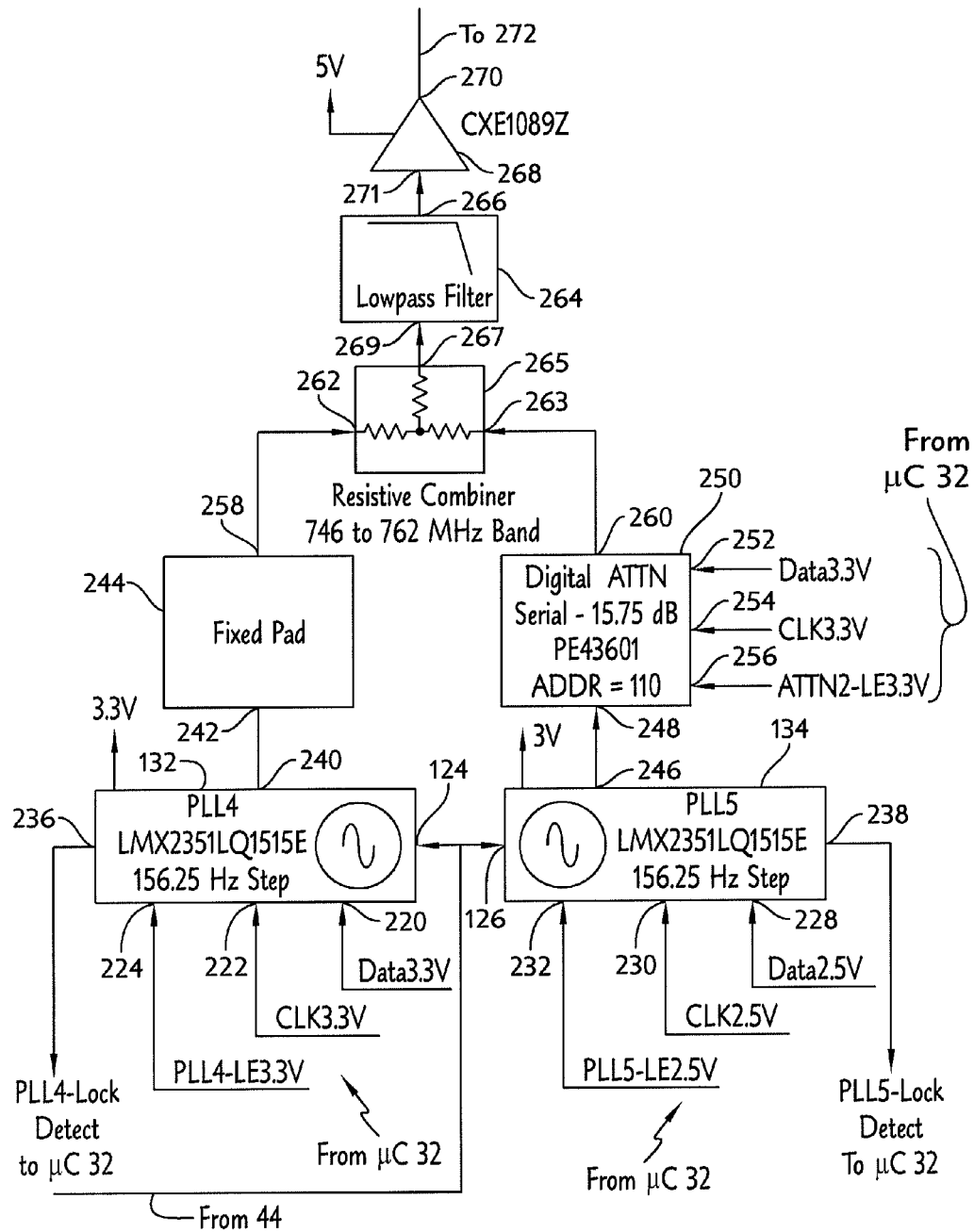
Figure 2F:
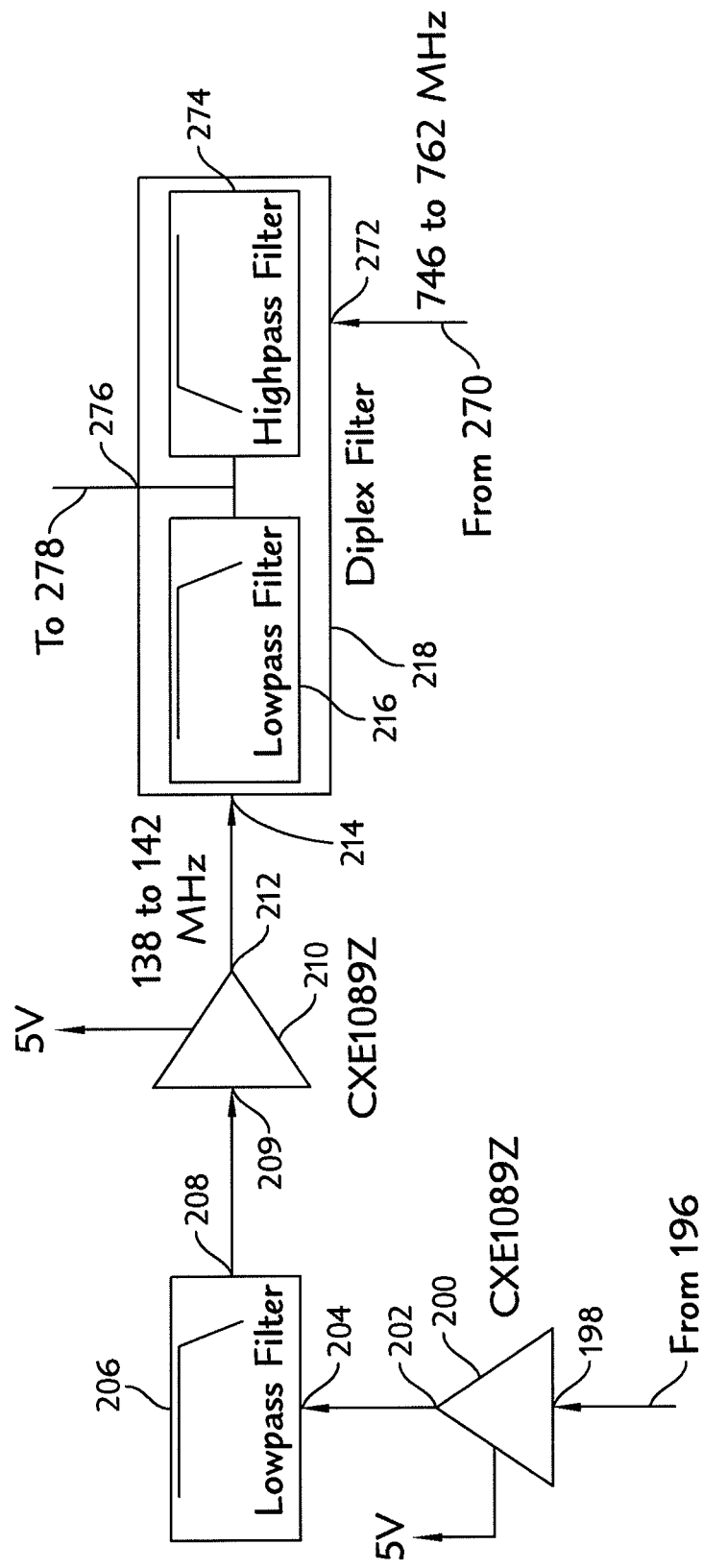
Figure 2G:
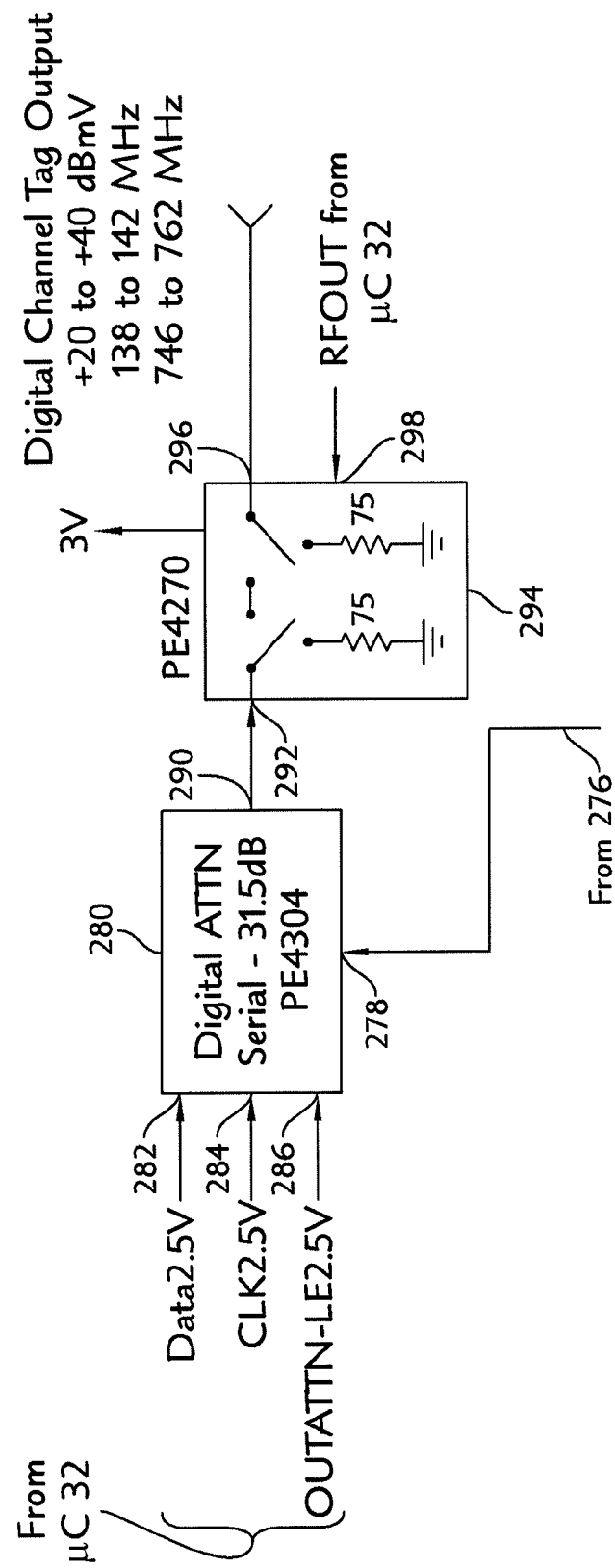

The tagger 31 also includes circuits for placing the described CW tag(s) between digital channels. Referring to FIGS. 2*d-e*, the output port 44 of 16 MHz reference oscillator 42 is coupled to input ports 120, 122, 124, 126, respectively, of PLLs 128, 130, 132, 134. PLL 128 has additional input ports 136, 138 and 140 which are coupled, respectively, to DATA2.5V, CLK2.5V and PLL2-LE2.5V. PLL 130 has additional input ports 137, 139 and 141 which are coupled, respectively, to DATA2.5V, CLK2.5V and PLL3-LE2.5V. Each of PLLs 128, 130 illustratively is a Texas Instruments LMX2485E low power dual PLL with a 156.25 Hz step. Only one PLL of each LMX2485E IC is used. Output ports 144, 146 of PLL 128 respectively supply tuning voltage to an input port 147 of a VCO 148 and PLL 2 LOCK DETECT to μC 32. Output ports 150, 152 of PLL 130 respectively supply tuning voltage to an input port 153 of a VCO 154 and PLL 3 LOCK DETECT to μC 32. VCOs 148, 154 illustratively are Maxim type MAX2606 VCOs. An output port 156 of VCO 148 provides frequency/phase feedback to PLL 128. An output port 158 of VCO 148 is coupled to an input port 160 of a fixed attenuator pad 161. An output port 163 of VCO 154 provides frequency/phase feedback to PLL 130. An output port 164 of VCO 154 is coupled to an input port 166 of a variable attenuator 168, illustratively a Peregrine Semiconductor type PE43601 digital attenuator. Additional input ports 170, 172, 174, respectively, of variable attenuator 168 receive DATA3.3V, CLK3.3V and ATTN2-LE3.3V signals from μC 32. The output ports 162 and 178 of fixed attenuator pad 161 and variable attenuator 168 are coupled to input ports 180, 182 of a resistive combiner 184 to combine the signals from fixed attenuator pad 161 and variable attenuator 168 in the manner to be described in connection with FIGS. 8 and 9. An output port 186 of combiner 184 is coupled to an input port 188 of a variable attenuator 189, illustratively a Peregrine Semiconductor type PE43601 digital attenuator. Additional ports 190, 192, 194, respectively, of variable attenuator pad 189 receive DATA3.3V, CLK3.3V and ATTN2-LE3.3V signals from μC 32. An output port 196 of variable attenuator pad 189 is coupled to an input port 198 (FIG. 2*f*) of an amplifier 200, illustratively an RF Micro Devices type CXE1089Z amplifier. An output port 202 of amplifier 200 is coupled to an input port 204 of a low pass filter 206 ($f_C$=160 MHz). An output port 208 of filter 206 is coupled to an input port 209 of an amplifier 210, illustratively an Analog Devices type CXE1089Z amplifier. An output port 212 of amplifier 210 is coupled to an input port 214 of the low pass filter section 216 ($f_C$=300 MHz) of a diplex filter 218.

Referring to FIG. 2*e*, PLL 132 has additional input ports 220, 222 and 224 which are coupled, respectively, to DATA3.3V, CLK3.3V and PLL4-LE3.3V. PLL 134 has additional input ports 228, 230 and 232 which are coupled, respectively, to DATA2.5V, CLK2.5V and PLL5-LE2.5V with a 156.25 Hz step. PLLs 132, 134 illustratively are Texas Instruments LMX2351LQ1515E PLLs. An output port 236 of PLL 132 supplies PLL 4 LOCK DETECT to μC 32. An output port 238 of PLL 134 supplies PLL 5 LOCK DETECT to μC 32. An output port 240 of PLL 132 is coupled to an input port 242 of a fixed attenuator pad 244. An output port 246 of PLL 134 is coupled to an input port 248 of a variable attenuator 250, illustratively a Peregrine Semiconductor type PE43601 digital attenuator. Additional ports 252, 254, 256, respectively, of variable attenuator 250 receive DATA3.3V, CLK3.3V and ATTN2-LE3.3V signals from μC 32. The output ports 258, 260 of fixed attenuator pad 244 and variable attenuator 250 are coupled to respective input ports 262 and 263 of a resistive combiner 265. An output port 267 of combiner 265 is coupled to an input port 269 of a low pass filter 264 ($f_C$=800 MHz). An output port 266 of filter 264 is coupled to an input port 271 of an amplifier 268, illustratively an RF Micro Devices type CXE1089Z amplifier. An output port 270 of amplifier 268 is coupled to an input port 272 (FIG. 2*f*) of the high pass filter section 274 ($f_C$=300 MHz) of diplex filter 218. An output port 276 of filter 218 is coupled to an input port 278 of a digital attenuator 280, illustratively, a Peregrine Semiconductor PE4304 digital attenuator. Additional input ports 282, 284, 286, respectively, of variable attenuator 280 receive DATA2.5V, CLK2.5V and OUTputATTeNuator-LE2.5V signals from μC 32. An output port 290 of attenuator 280 is coupled to an input port 292 of a switch 294, illustratively, a Peregrine Semiconductor type PE4270 switch. A digital channel tag of +20 to +40 dBmV, 138 MHz to 142 MHz or 746 MHz to 762 MHz, of the type described herein is thus provided at an output port 296 of switch 294. Switch 294 also includes a port 298 for receiving RF OUTput control signal from μC 32.

A block diagram of the tag receiver is illustrated in FIGS. 3*a-g*. As illustrated there, and as described in greater detail in U.S. Ser. No. 61/592,195, the disclosure of which is hereby incorporated herein by reference, the tag receiver μC board 336 (FIG. 3*a*) includes: two digital-to-analog converter (hereinafter sometimes DAC) outputs; an Antenna Select feature; a Band Select feature; an RF Enable feature; an RF board Identity Resistor input that permits the μC 338 on board 336 to identify the type of RF board to which the μC board 336 is coupled, based upon the output from the identity resistor(s); a PLL Clock output; a PLL Data output; a PLL Latch Enable output; an RF board power source input; and a Common Ground Connection. The μC board 336 further includes a field programmable gate array (hereinafter sometimes FPGA) 340, and an analog-to-digital converter (hereinafter sometimes ADC) 342 for receiving IF output from the tag receiver's RF board and A/D converting the IF for processing by the FPGA 340 and coupling to the μC 338.

Although described in greater detail in U.S. Ser. No. 61/592,195, in summary, IF from the tag receiver's RF board is analog-to-digital converted by the ADC 342. The ADC 342 outputs are processed by the FPGA 340 as described in U.S. Ser. No. 61/592,195. The results of the processing are provided to the μC 338 for further processing, display, and storage. The μC 338 determines which of the antenna inputs is in use via the Antenna Select. The DAC outputs are used to tune an input filter of a low frequency band. The Band Select output determines which of the RF input bands is active. The RF Enable is used to turn the RF board on or off depending on the use of the device. As noted above, the RF board Identity Resistor input indicates to the μC 338 which revision of RF board the μC board 336 is coupled to, in case there are differences between RF board revisions that might affect the control of the RF board. The PLL Clock output, the PLL Data output and PLL Latch Enable control the RF frequency. The RF board power source provides the power necessary to activate all of the circuitry contained on the RF board. The Common Ground Connection is a common reference for signals shared between the μC and RF boards.

Figure 3A:
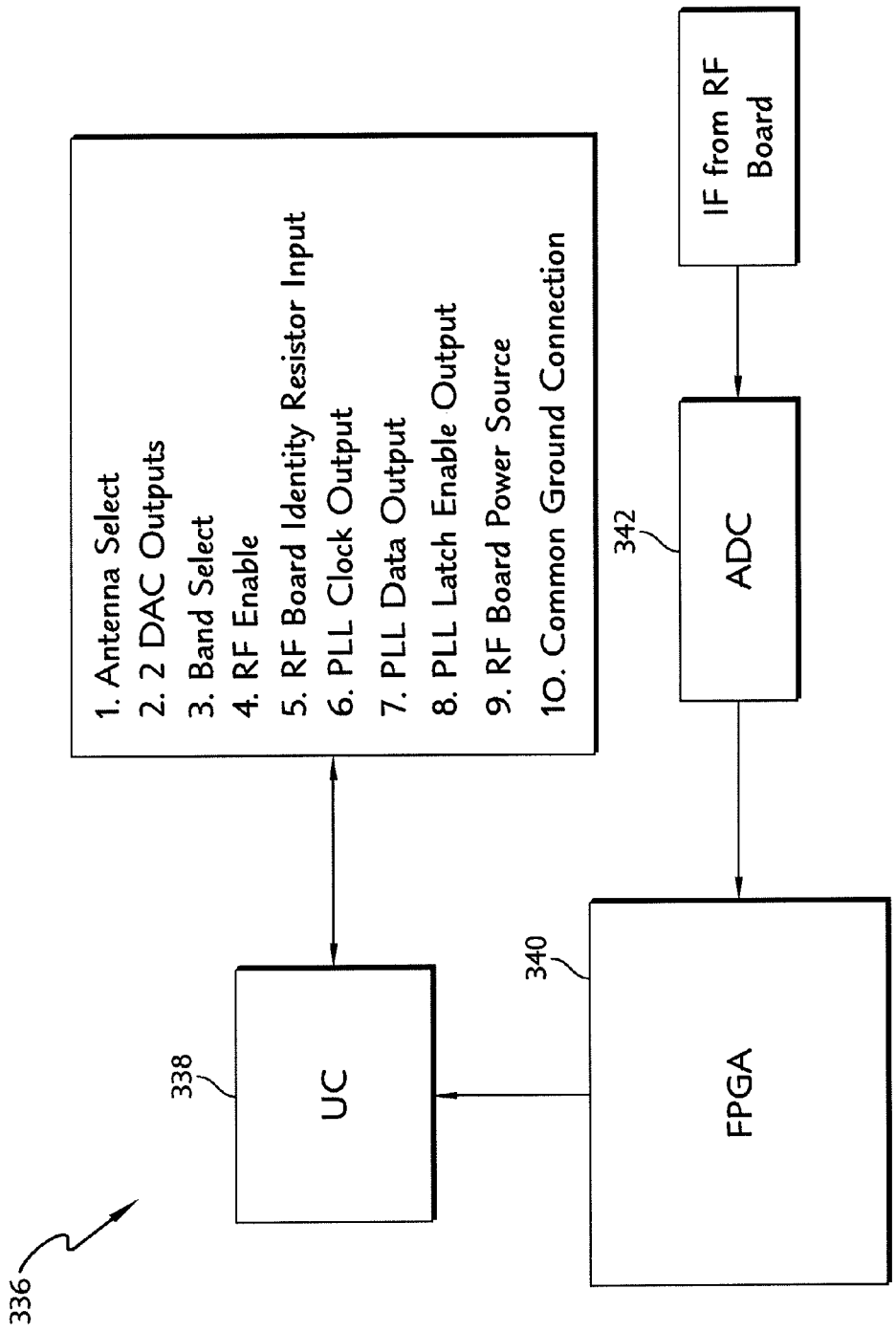
FIGS. 3*a-g* illustrate a block diagram of a tag receiver μC board.
Figure 3B:
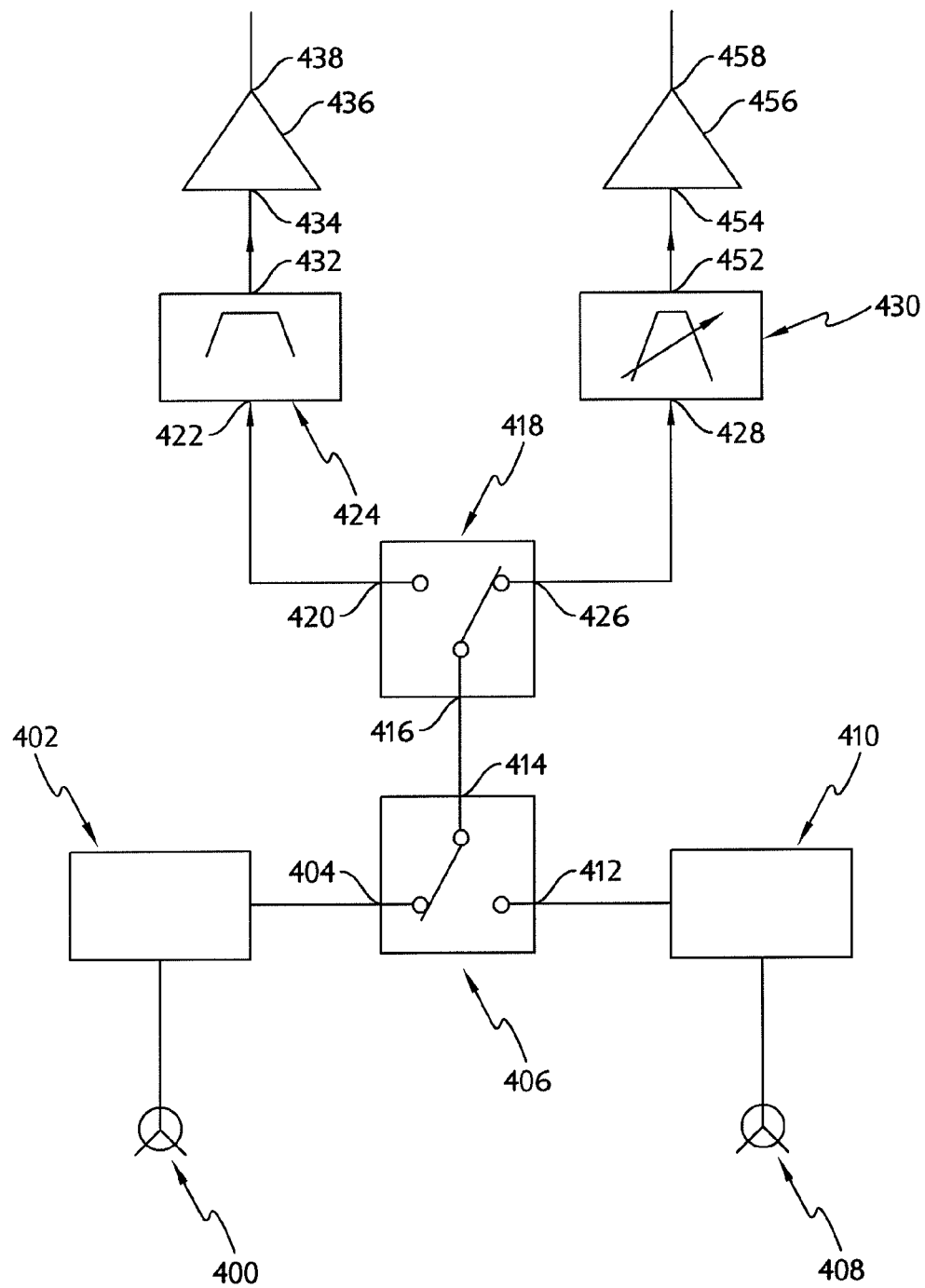

Referring now particularly to FIG. 3*b*, a first antenna 400 such as, for example, a so-called "rubber ducky" antenna, is coupled through electrostatic discharge protection (hereinafter sometimes ESD protection) 402 which may be, for example, a Raychem PESD0603 bi-directional ESD protector, to an input port 404 of a switch 406 which may be, for example, a Hittite Microwave Corporation HMC545 switch. A second antenna 408, here a mobile mount antenna, is coupled through ESD protection 410 which may be, for example, a Raychem PESD0603 bi-directional ESD protector, to another input port 412 of switch 406. The position of switch 406 thus determines which antenna 400, 408 will be the source of the signal for further processing.

An output port 414 of switch 406 is coupled to an input port 416 of a switch 418 which may be, for example, a Hittite Microwave Corporation HMC545 switch. An output port 420 of switch 418 is coupled to an input port 422 of a bandpass filter 424 such as, for example, a TriQuint part number 856866 surface acoustic wave (hereinafter sometimes SAW) filter having a 756 MHz center frequency and a 20 MHz bandwidth. The signal supplied to port 422 will have a frequency in the range of about 746 MHz to 762 MHz. Another output port 426 of switch 418 is coupled to an input port 428 of a tunable bandpass filter 430 such as, for example, a varactor tuned LC bandpass filter having an adjustable center frequency in the range of 138 MHz to 142 MHz. The signal supplied to port 428 will have a frequency in this range.

Figure 3C:
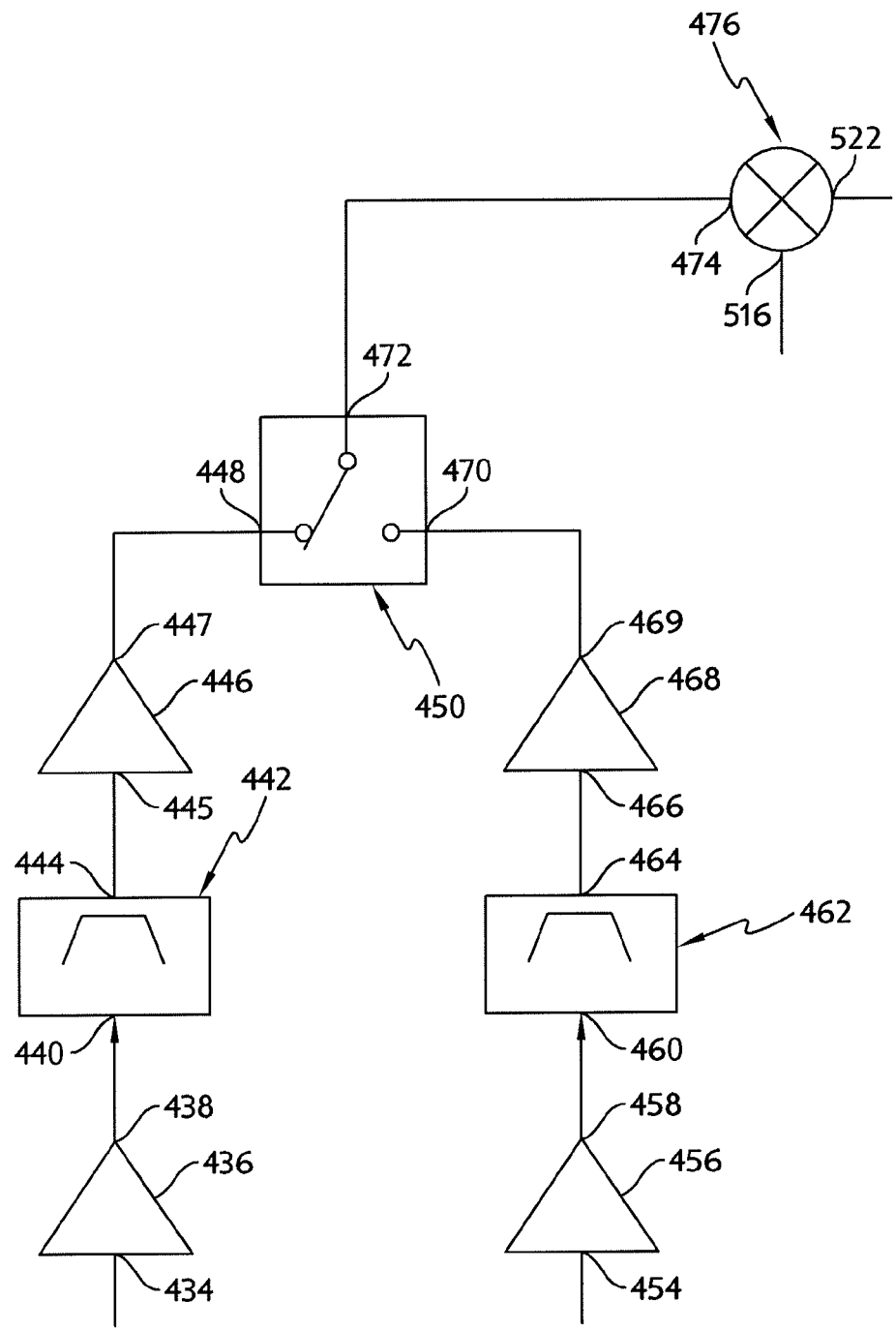

Referring now to FIGS. 3b-c, the output port 432 of bandpass filter 424 is coupled to an input port 434 of an RF amplifier 436 which may be, for example, an RF Micro Devices SGC4563 amplifier. An output port 438 of amplifier 436 is coupled to an input port 440 of a bandpass filter 442 such as, for example, a TriQuint part number 856866 SAW filter having a 756 MHz center frequency and a 20 MHz bandwidth. An output port 444 of filter 442 is coupled to an input port 445 of an RF amplifier 446 which may be, for example, an RF Micro Devices SGC2463 amplifier. An output port 447 of amplifier 446 is coupled to an input port 448 of a switch 450 which may be, for example, a Hittite Microwave Corporation HMC545 switch.

Continuing to refer to FIGS. 3b-c, an output port 452 of filter 430 is coupled to an input port 454 of an RF amplifier 456 which may be, for example, an RF Micro Devices SGC4563 amplifier. An output port 458 of amplifier 456 is coupled to an input port 460 of a bandpass filter 462 such as, for example, an Oscilent part 813-SL140.0M-05 bandpass filter having a 142 MHz center frequency and a 4.8 MHz bandwidth. An output port 464 of filter 462 is coupled to an input port 466 of an RF amplifier 468 such as, for example, an RF Micro Devices SGC2463 amplifier. An output port 469 of amplifier 468 is coupled to an input port 470 of switch 450. The circuitry described so far is thus capable of receiving and processing signals in the 746-762 MHz band as well as in the 138-142 MHz band. The positions of the switches 418, 450 determine which of these bands is passed for further processing.

Figure 3D:
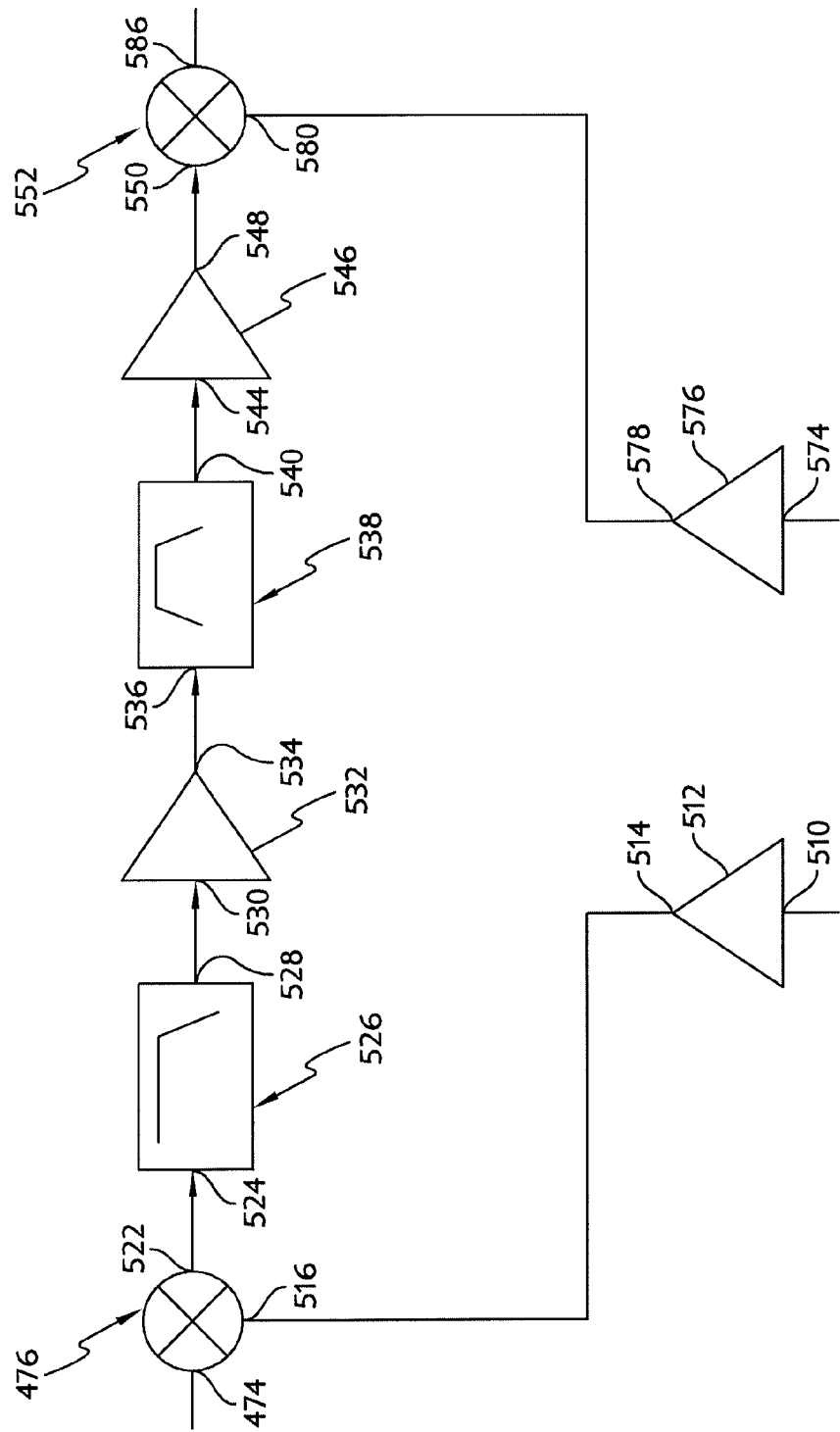
Figure 3E:
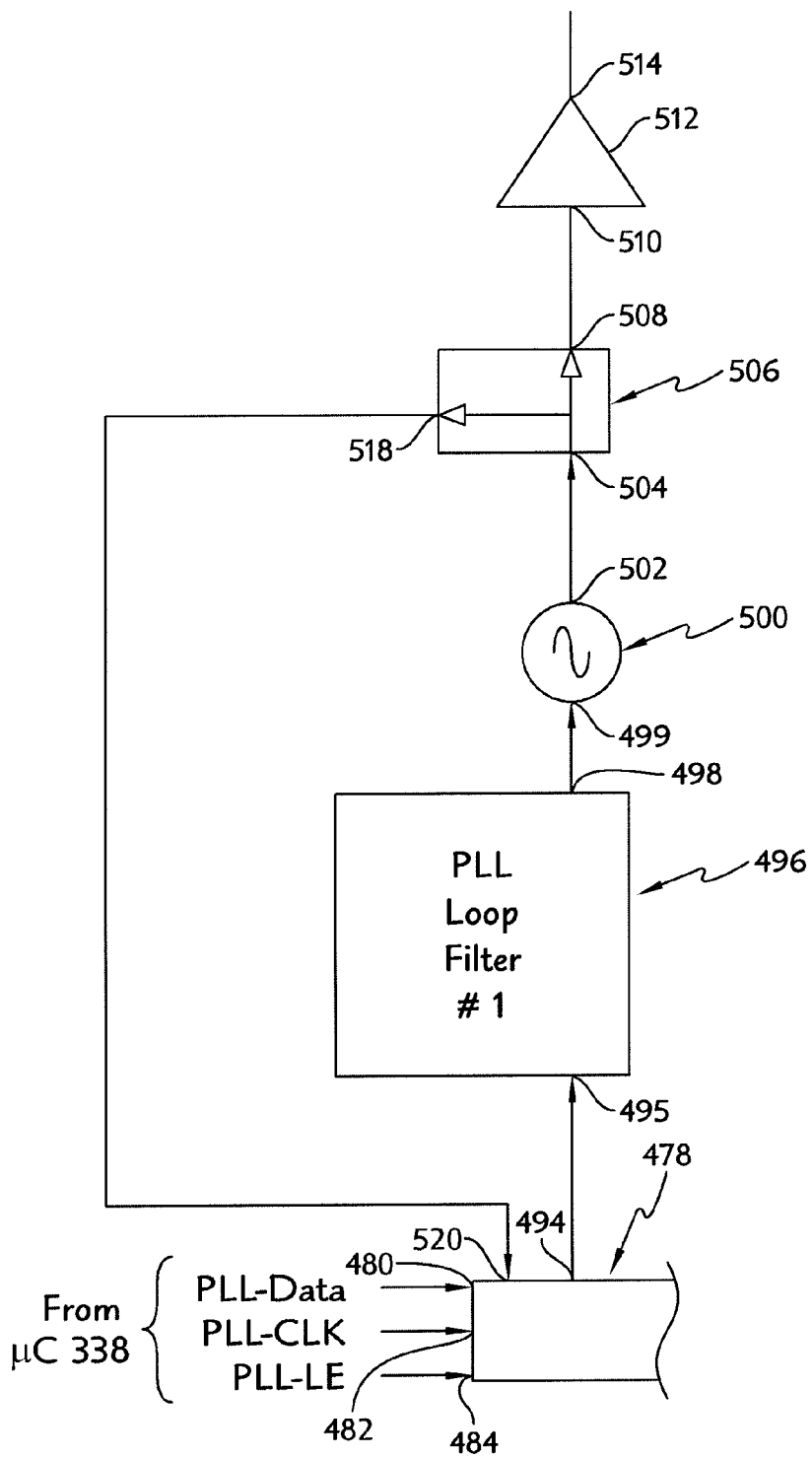
Figure 3F:
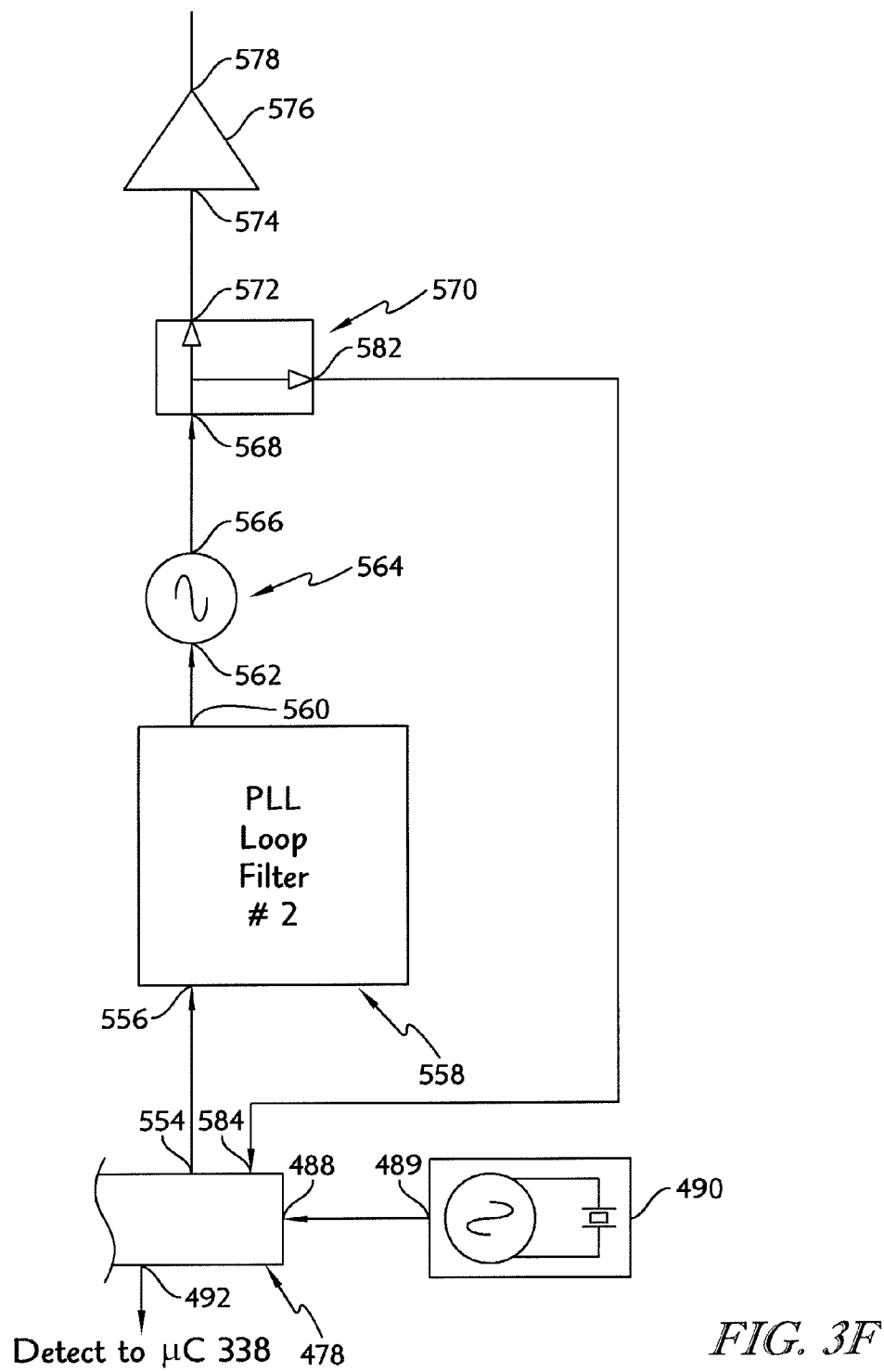

Referring now to FIGS. 3c-d, an output port 472 of switch 450 is coupled to an input port 474 of a mixer 476 which may be, for example, a Mini-Circuits ADE-2 mixer. Referring to FIG. 3e, the local oscillator (hereinafter sometimes LO) signal for mixer 476 is provided from a dual PLL IC 478 such as, for example, an Analog Devices ADF4208 dual RF PLL frequency synthesizer. Input ports 480, 482, 484 of PLL IC 478 receive PLL-DATA, PLL-CLocK and PLL-LatchEnable signals, respectively, from μC 338. Referring to FIG. 3f, an OSCillator input port 488 of PLL IC 478 receives oscillator signal from an output port 489 of a reference oscillator 490 such as, for example, a Vectron VT-803-FAJ-5070-16M0000000 16 MHz reference oscillator IC. Output from the PLL IC 478 to the μC 338 is provided through a PLL lock detect output port 492.

Referring back to FIG. 3e, an IF-PLL2 output port 494 of PLL IC 478 is coupled to an input port 495 of a PLL loop filter #1, 496. An output port 498 of filter 496 is coupled to an input port 499 of a voltage controlled oscillator 500 which may be, for example, a Maxim MAX2606 VCO. An output port 502 of VCO 500 is coupled to an input port 504 of an amplifier 506 which may be, for example, a Maxim MAX2471 differential output VCO buffer amplifier. An output port 508 of amplifier 506 is coupled to an input port 510, FIGS. 3d-e, of an RF amplifier 512 such as, for example, an RF Micro Devices SGC2463 amplifier. An output port 514 of amplifier 512 is coupled to an input port 516 of mixer 476. In HighBand mode, a signal having a frequency in the 431 MHz to 447 MHz range is provided to port 516. In the LowBand mode, a signal having a frequency in the 453 MHz to 457 MHz range is provided to port 516. Another output port 518 of amplifier 506 is coupled to a phase lock input port 520 of PLL IC 478.

An output port 522 of mixer 476 is coupled to an input port 524 of a 375 MHz LC lowpass filter 526. An output port 528 of filter 526 is coupled to an input port 530 of an RF amplifier 532 which may be, for example, an RF Micro Devices SGC2463 amplifier. An output port 534 of amplifier 532 is coupled to an input port 536 of a bandpass filter 538 such as, for example, an EPCOS B3792 315 MHz center frequency, 300 KHz bandwidth SAW filter. An output port 540 of filter 538 is coupled to an input port 544 of an RF amplifier 546 such as, for example, an RF Micro Devices SGC2463 amplifier. An output port 548 of amplifier 546 is coupled to an input port 550 of a mixer 552 such as, for example, a Mini-Circuits ADE-2 mixer.

Referring back to FIG. 3f, an RF-PLL2 output port 554 of PLL IC 478 is coupled to an input port 556 of a PLL loop filter #2, 558. An output port 560 of filter 558 is coupled to an input port 562 of a voltage controlled oscillator 564 which may be, for example, a Maxim MAX2606 VCO. An output port 566 of VCO 564 is coupled to an input port 568 of an amplifier 570 which may be, for example, a Maxim MAX2471 differential output VCO buffer amplifier. An output port 572 of amplifier 570 is coupled to an input port 574 (FIGS. 3d and 3f) of an RF amplifier 576 such as, for example, an RF Micro Devices SGC2463 amplifier. An output port 578 of amplifier 576 is coupled to an input port 580 (FIGS. 3d and 3g) of mixer 552. The signal supplied to port 580 has a frequency of 325.7 MHz. Another output port 582 (FIG. 3f) of amplifier 570 is coupled to a phase lock input port 584 of PLL IC 478.

Figure 3G:
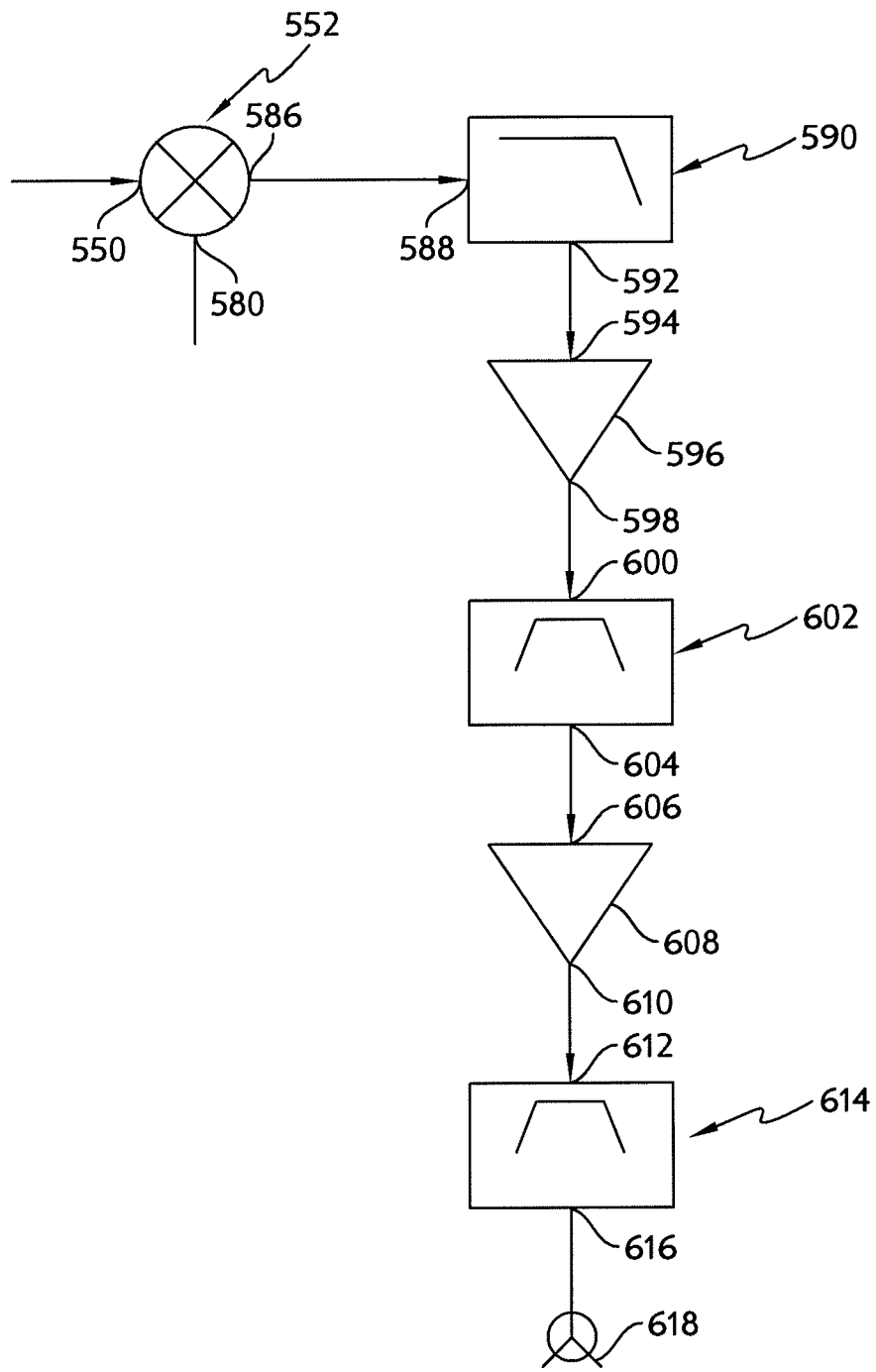

Referring now to FIG. 3g, an output port 586 of mixer 552 is coupled to an input port 588 of a 25 MHz LC lowpass filter 590. An output port 592 of filter 590 is coupled to an input port 594 of an RF amplifier 596 such as, for example, an Analog Devices AD8001 video amplifier. An output port 598 of amplifier 596 is coupled to an input port 600 of a bandpass filter 602 having a 10.7 MHz center frequency and a 15 KHz bandwidth. Illustratively, bandpass filter 602 is an ECS-10.7-15B, four pole 10.7 MHz crystal filter. An output port 604 of filter 602 is coupled to an input port 606 of an RF amplifier 608 such as, for example, an Analog Devices AD8001 video amplifier. An output port 610 of amplifier 608 is coupled to an input port 612 of a bandpass filter 614 having a 10.7 MHz center frequency and a 15 KHz bandwidth. Illustratively, bandpass filter 614 is an ECS-10.7-15B, four pole 10.7 MHz crystal filter. The 10.7 MHz signal appearing at an output port 616 of filter 614 is coupled to a 10.7 MHz input port 618 on the μC 338, FIG. 3a.

Figure 4:
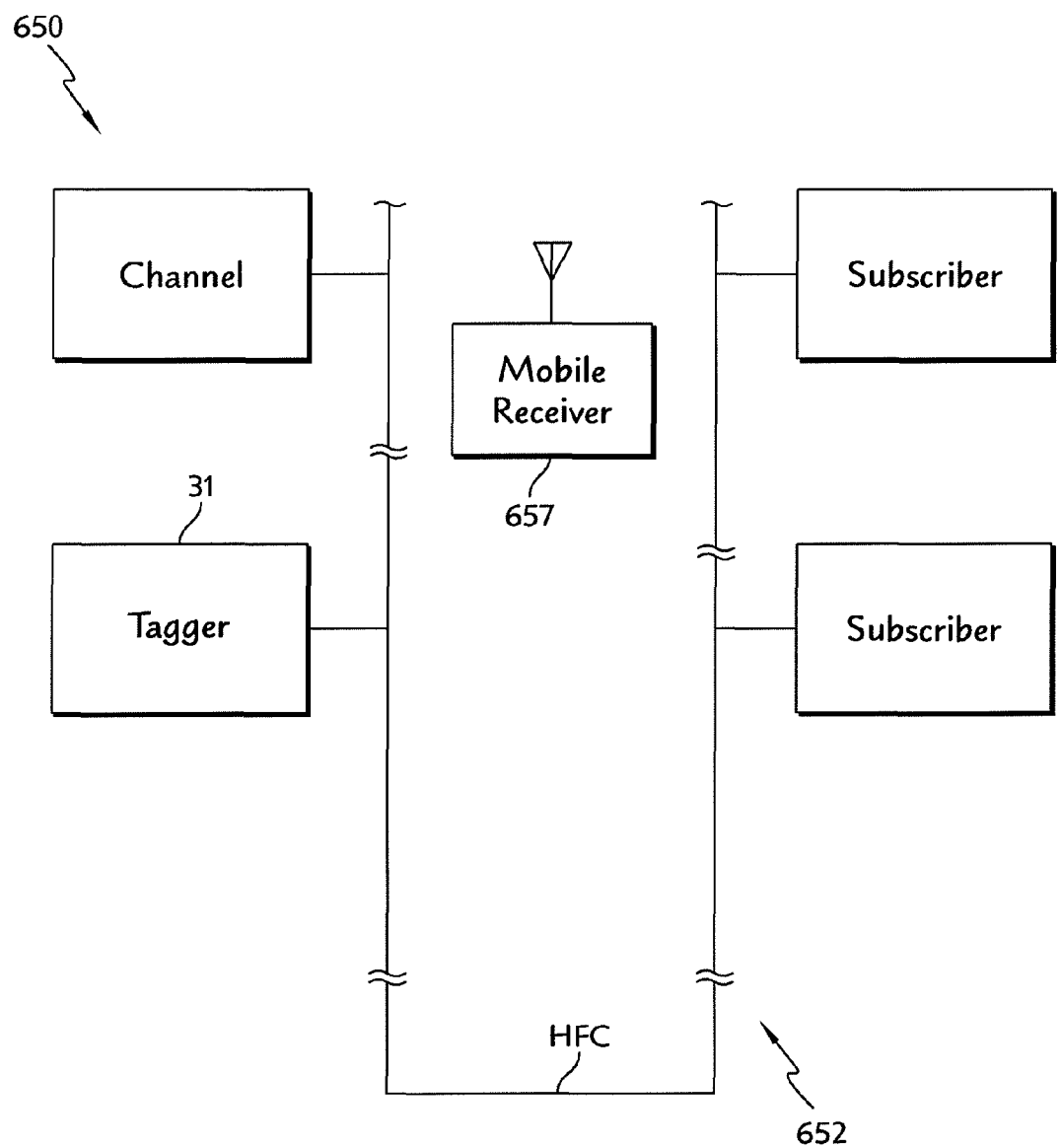
FIG. 4 illustrates a system level block diagram.

FIG. 4 illustrates a system level block diagram. As illustrated in FIG. 4, the existing cable system signals may be digital, analog, or mixed. The tagger 31 of the present invention is typically located at the headend 650 of the cable plant 652 so that signal leakage from the cable plant 652 will include the continuous wave (hereinafter sometimes CW) signals inserted between digital channels by the tagger 31.

Figure 5:
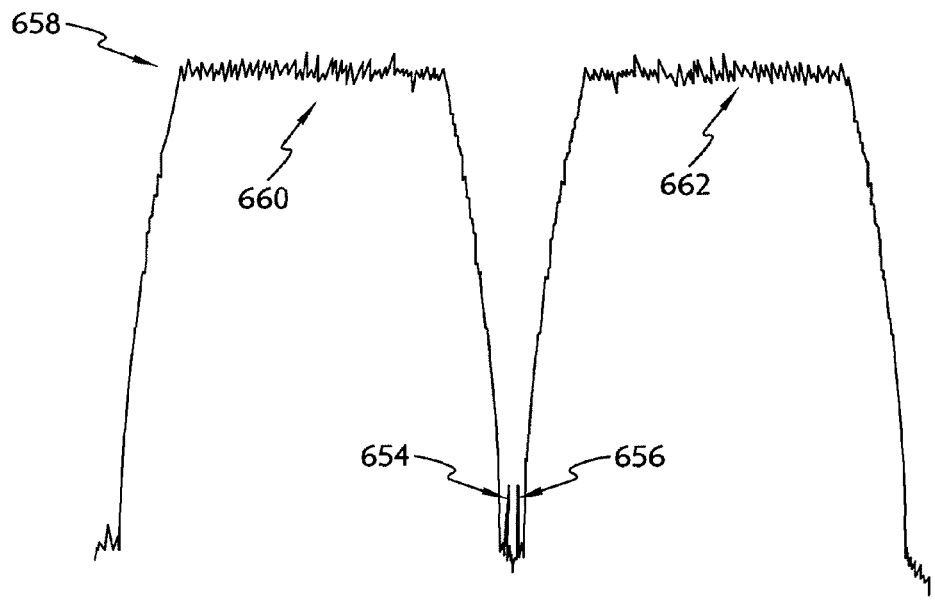
FIG. 5 illustrates a waveform useful in understanding the invention.

FIG. 5 illustrates an example of insertion of two CW signals 654, 656 into the notch 43 dB below channel signal level 658 between two adjacent digital channels 660, 662. So, at the tagger 31, the tag signals 654, 656 are inserted into digital signal channel plans at about −43 dB. Illustratively the inserted tag signals 654, 656 are of the same amplitude or in a known amplitude ratio or relationship, and spaced apart a known frequency from each other. Thus, when the cable plant 652 leaks signal into the environment, the tag signals 654, 656 will be present in the leak. The signals may be at or below the tag receiver noise floor due, for example, to the relatively small magnitude of the leak, or to the leak being observed from a distance.

The mobile receiver 657 employs one of at least two different analysis methods to detect the tag signals 654, 656. The illustrated methods are convolution and FFT analysis. Both of these methods reduce the noise floor by employing a large sample window of the signal.

Figure 6:
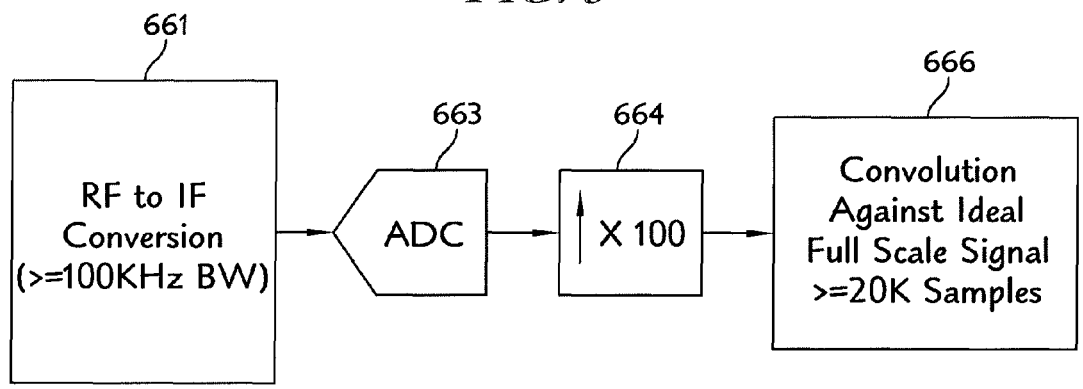
FIG. 6 illustrates a described method.

The convolution method is illustrated in FIG. 6. According to this method, the received RF is converted 661 to IF having a bandwidth (hereinafter sometimes BW)≥100 KHz. The IF is analog-to-digital converted 663, for example, to 1.6 megasamples/sec. (hereinafter sometimes Msps) and upsampled 664, for example, ×100, to, for example, 160 Msps. This digital signal is then convolved 666 against a ≥20 Ksample A/D converted window of the particular CW frequency or frequencies 654, 656 with which the digital channels 660, 662 are tagged. If a single signal 654 is used for tagging, only one convolution 666 is required. If two tagging signals 654, 656 are used, two convolutions 666 are required, and so on.

The output of the convolution method is quite highly frequency selective (~±1 Hz BW) and thus requires the tagger 31 to sweep the A/D converted tag signal(s) sample(s) through the bandwidth of the receiver at a known rate to be detected. The convolution method thus produces pulses at the known sweep rate as the A/D converted tag signal is swept through the detection bandwidth. This will be true for each detector used. The noise floor required for comparison can be obtained from the output of the detector when no pulse is present. The pulse train produced by the convolution method must rise above a known threshold when compared to the noise floor of the pulse train. Additionally, the convolution method requires a check of the remaining known (implicit) signal attributes, namely, equal or nearly equal amplitude and known sweep rate. If either of these additional signal attributes is not detected, the received signal is considered to be a noise signal rather than a leakage signal. The frequency separation criteria are met by using two detectors with spacing matching the frequency spacing produced by the tagger 31.

Figure 7:
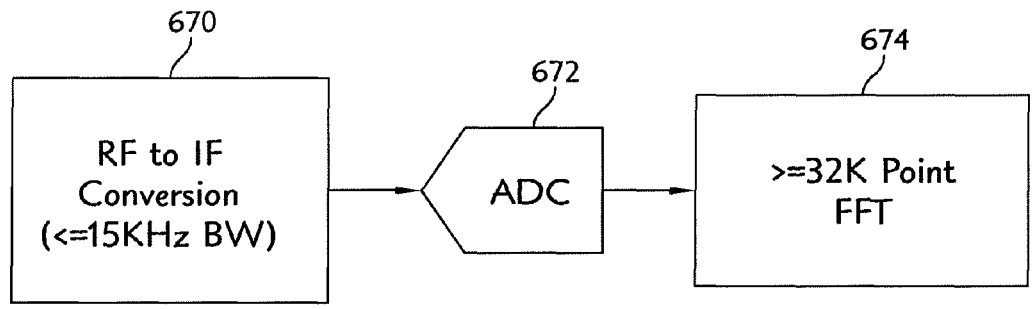
FIG. 7 illustrates another described method.

The FFT method is illustrated in FIG. 7. According to this method, the received RF is converted 670 to IF having a bandwidth ≤15 kHz. The IF is then analog-to-digital converted 672 (illustratively, to 80 Ksps) and is passed through a, for example, ≥32 Kpoint FFT 674.

The output of the FFT method includes all of the signals 654, 656 inserted by the tagger 31 regardless of location. Thus the signal does not need to be swept. Rather, the tag signal 654, 656 can be detected by a sweeping analysis of the data to find the tag signals 654, 656 wherever they may be. The FFT method produces a frequency spectrum similar to the output 654, 656 of the tagger 31. Since only the rough locations of the tag signals 654, 656 are known, all of the possible locations where the signal 654, 656 should be scanned to look for the controllable attributes (signals that rise above a particular threshold when compared to noise, equal or nearly equal amplitude, known frequency separation) of the signal.

Figure 8:
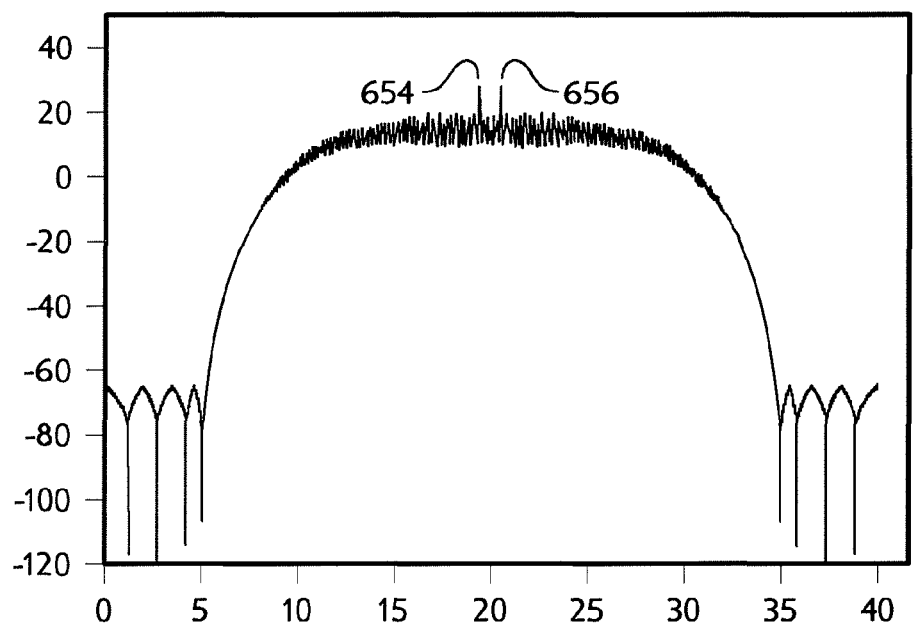
FIG. 8 illustrates another waveform useful in understanding the invention.

FIG. 8 illustrates a simulated FFT method. The dual CW carriers 654, 656 are identifiable in the middle portion of the spectrum. This example illustrates dual tag carriers 654, 656 with a frequency separation of 625 Hz. The method contemplates that the dual tag carriers 654, 656 may be varied by the user among a limited number of frequency separation choices. This list of choices might, for example, include dual tag carriers 654, 656 with optional 625 Hz and 156.25 Hz spacing. Of course, the options could include more choices if necessary or desirable. At present, test systems have 625 Hz and 156.25 Hz as the only options. Having two tag carriers 654, 656 with two spacing options 625 Hz and 156.25 Hz permits discrimination between two cable systems overbuilt in the same area. In this situation, the overbuilt systems would use different tag separations, in this example, one 625 Hz separation and the other 156.25 Hz separation. In the majority of cases, providing two tag carriers with two spacing options will not be a significant limitation since at the leak location one system will likely be radiating comparatively much higher levels than the other, such that only one of the two separations would show up in the FIG. 8 spectrum. However, in the instances in which the amplitudes of the tags 654, 656 from both systems are nearly the same, the described tagging method will permit discrimination between the sets of carrier tags 654, 656 by the spacing, in this case, either 625 Hz and 156.25 Hz, between the carriers 654, 656.

Figure 9:
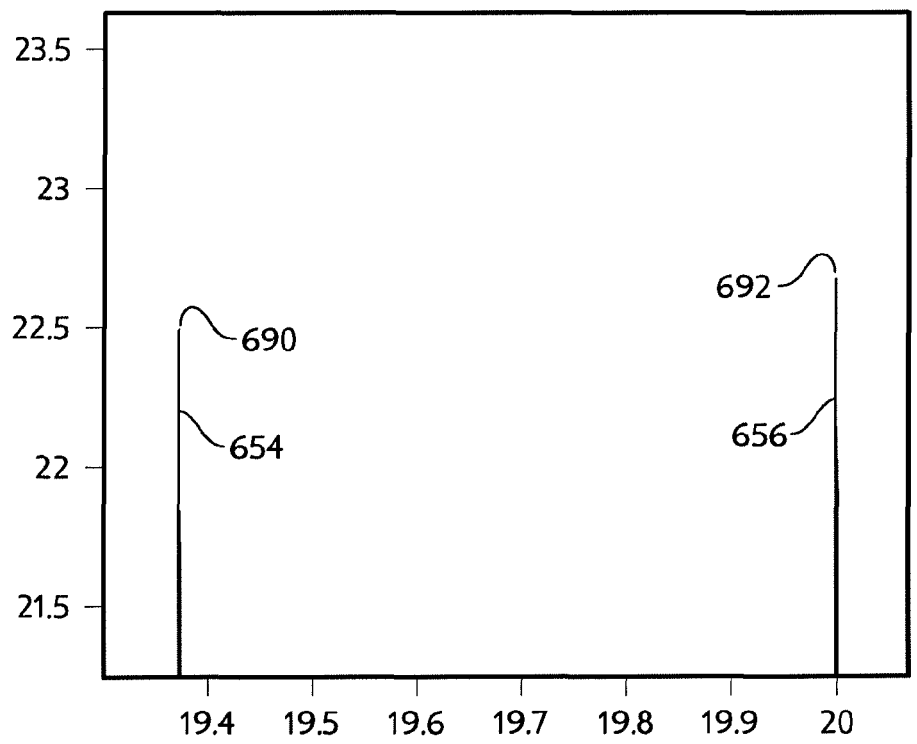
FIG. 9 illustrates a much enlarged view of a portion of the waveform illustrated in FIG. 8.

This method may be made even more robust through the addition of an amplitude matching requirement. For instance, and as illustrated in FIG. 9, a much enlarged view of a detail of the spectrum illustrated in FIG. 8, the detected carriers 654, 656 are not exactly the same amplitude. The levels 690, 692, respectively, of the carrier 654, 656 peaks fall within a tolerance window which permits a relatively small amount of amplitude variation high or low relative to the other member of the detected carrier pair 654, 656. For example the window might be ±2 dB.

In FIG. 9, the amplitude 690 of carrier 654 at 22.5 dB is about 0.25 dB below the amplitude 692 of carrier 656 and would be considered amplitude matched to the right carrier 656. This is in addition to the carriers 654, 656 being at the correct frequency spacing, again, in the illustrated case, either 625 Hz or 156.25 Hz, including a reasonable tolerance of, for example, ±12 Hz. Some factors influencing the reliability of the FFT scheme include system noise that approaches the amplitudes of the carrier 654, 656 pair, other overbuilt systems radiating into the environment, and non-system sources of noise radiating at the frequency or frequencies of interest.

What is claimed is:

1. A method for detecting leakage in a digital cable system, the method comprising: inserting at least one first signal with an amplitude multiple tens of dB below a digital channel power of digital channels carried on the digital cable system;
receiving a second signal containing the at least one first signal;
converting the second signal to an intermediate frequency (IF) signal;
digitizing the IF signal to create a digitized IF signal;
obtaining samples of the digitized IF signal;

providing a set of digitized samples of a third signal at a nominal frequency or nominal frequencies of the at least one first signal at maximum amplitude converted to the IF;

correlating the digitized IF signal and the digitized samples of the third signal at the nominal frequency or nominal frequencies of the at least one first signal at maximum amplitude converted to the IF; and, detecting the presence of the inserted at least one first signal based upon the result of the correlation.

2. The method of claim 1 further including sweeping the at least one first signal to promote correlation with the digitized samples of the third signal.

3. The method of claim 2 wherein sweeping the at least one first signal comprises sweeping the at least one first signal at a transmitting device.

4. The method of claim 2 wherein sweeping the at least one first signal comprises sweeping the at least one first signal at a receiving device.

5. The method of claim 1 wherein converting the second signal to an IF signal comprises converting the second signal to an IF signal having a bandwidth of about 100 KHz.

6. The method of claim 1 wherein converting the second signal to an IF signal comprises converting the second signal to an IF signal having a frequency greater than about 0.2% of a digitizing frequency of the IF.

7. The method of claim 1 wherein inserting the at least one first signal comprises inserting the at least one first signal at a frequency below a digital channel signal.

8. The method of claim 1 wherein inserting the at least one first signal comprises inserting the at least one first signal at a frequency above a digital channel signal.

9. The method of claim 1 wherein detecting the presence of the inserted at least one first signal based upon the result of the correlation comprises detecting the presence of the inserted at least one first signal within an ~250 ms window.

10. The method of claim 1 wherein obtaining samples of the digitized IF signal comprises obtaining samples of the digitized IF signal using an A/D converter.

11. The method of claim 1 wherein obtaining samples of the digitized IF signal comprises obtaining samples of the digitized IF signal using an A/D converter having a first sampling rate and then upsampling the data to a second, higher sample rate.

12. The method of claim 1 wherein converting the second signal to an IF signal comprises converting the second signal to a 455 KHz IF signal.

13. A method for detecting leakage in a digital cable system, the method comprising: inserting a pair of first signals spaced apart a fixed frequency and with amplitudes multiple tens of dB below a digital channel power of digital channels carried on the digital cable system;

receiving a second signal containing the first signals;

converting the second signal to an intermediate frequency (IF) signal;

digitizing the IF signal to create a digitized IF signal;

obtaining samples of the digitized IF signal;

applying a large scale Fast Fourier Transform (FFT) to the second signal to generate an FFT output;

examining the FFT output for generally equally sized signals separated from each other by a fixed frequency in the FFT output; and, if generally equally sized signals separated from each other by the fixed frequency of the FFT output are detected in the FFT output, deciding that the second signal represents detected leakage from the digital cable system.

14. The method of claim 13 wherein the FFT has a sample size on the order of at least about 32 kilosamples (32 Ksamples).

15. The method of claim 13 wherein converting the second signal to an IF signal comprises converting the second signal to an IF signal having a bandwidth of about 15 KHz.

16. The method of claim 13 wherein inserting a pair of first signals spaced apart a fixed frequency comprises inserting the pair of first signals between adjacent digital channels.

17. The method of claim 13 wherein obtaining samples of the digitized IF signal comprises obtaining samples of the digitized IF signal using an A/D converter.

18. The method of claim 13 wherein converting the second signal to an IF signal comprises converting the second signal to a 10.7 MHz IF.

\* \* \* \* \*